(12) United States Patent
Sorenson et al.

(10) Patent No.: US 9,841,154 B2
(45) Date of Patent: Dec. 12, 2017

(54) LUMINAIRE UTILIZING LIGHT EMITTING DIODES

(71) Applicant: Cree, Inc., Durham, NC (US)

(72) Inventors: Jeremy Sorenson, Oak Creek, WI (US); Andrew Dan Bendtsen, Racine, WI (US); Kurt S. Wilcox, Libertyville, IL (US); David P. Goelz, Milwaukee, WI (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/060,306

(22) Filed: Mar. 3, 2016

(65) Prior Publication Data

US 2016/0186970 A1 Jun. 30, 2016

Related U.S. Application Data

(63) Continuation-in-part of application No. PCT/US2014/030017, filed on Mar. 15, 2014, and a
(Continued)

(51) Int. Cl.
| | |
|---|---|
| G02B 6/26 | (2006.01) |
| G02B 6/42 | (2006.01) |
| F21S 8/08 | (2006.01) |
| F21V 21/116 | (2006.01) |
| G02B 6/30 | (2006.01) |

(Continued)

(52) U.S. Cl.
CPC .............. *F21S 8/086* (2013.01); *F21V 21/116* (2013.01); *G02B 6/0006* (2013.01); *G02B 6/0021* (2013.01); *G02B 6/0031* (2013.01); *G02B 6/0035* (2013.01); *G02B 6/24* (2013.01); *G02B 6/262* (2013.01); *G02B 6/305* (2013.01); *G02B 6/32* (2013.01); *G02B 6/34* (2013.01); *F21V 29/51* (2015.01); *F21W 2131/103* (2013.01);
(Continued)

(58) Field of Classification Search
CPC ...... F21V 21/116; F21V 23/008; F21V 29/70; F21V 29/73; F21V 15/01; F21S 8/086; G02B 6/0006; G02B 6/0021; G02B 6/0031; G02B 6/0035; G02B 6/24; G02B 6/262; G02B 6/305; G02B 6/32; G02B 6/34
USPC ............................................ 385/27; 362/234
See application file for complete search history.

(56) References Cited

U.S. PATENT DOCUMENTS

| | | | | |
|---|---|---|---|---|
| 5,510,969 A | * | 4/1996 | Rodger | ................... F21V 11/18 362/281 |
| 2010/0084979 A1 | * | 4/2010 | Burton | ..................... F21K 9/00 315/82 |

(Continued)

OTHER PUBLICATIONS

International Search and Written Opinion dated May 18, 2017, for International Application No. PCT/US17/19837, filed Feb. 28, 2017, Applicant, Cree, Inc. (11 pages).

*Primary Examiner* — Jerry Blevins
(74) *Attorney, Agent, or Firm* — McCracken & Gillen LLC

(57) ABSTRACT

According to one aspect, a luminaire comprises a luminaire housing, at least one LED disposed within the luminaire housing, and an LED driver circuit disposed within a driver housing. The driver housing comprises an inner portion and an outer portion, wherein at least a part of the inner portion is disposed between the LED driver circuit and the outer portion and wherein the LED driver circuit is in thermal communication with the outer portion.

19 Claims, 42 Drawing Sheets

Related U.S. Application Data continuation-in-part of application No. 14/485,609, filed on Sep. 12, 2014, and a continuation-in-part of application No. 14/657,988, filed on Mar. 13, 2015, now Pat. No. 9,709,725, and a continuation-in-part of application No. 29/496,754, filed on Jul. 16, 2014, now Pat. No. Des. 764,091.

(60) Provisional application No. 62/301,572, filed on Feb. 29, 2016, provisional application No. 62/301,559, filed on Feb. 29, 2016.

(51) Int. Cl.
```
G02B 6/32      (2006.01)
G02B 6/34      (2006.01)
F21V 8/00      (2006.01)
G02B 6/24      (2006.01)
F21W 131/103   (2006.01)
F21V 29/51     (2015.01)
F21Y 115/10    (2016.01)
F21Y 113/13    (2016.01)
```

(52) U.S. Cl.
CPC ........ *F21Y 2113/13* (2016.08); *F21Y 2115/10* (2016.08)

(56) References Cited

U.S. PATENT DOCUMENTS

| | | | | |
|---|---|---|---|---|
| 2011/0205752 A1* | 8/2011 | Allen | ............... | F21V 15/01 362/555 |
| 2012/0014063 A1* | 1/2012 | Weiss | ............... | H05K 7/20163 361/697 |
| 2012/0170262 A1* | 7/2012 | Hoetzl | ............... | F21V 29/004 362/227 |
| 2014/0008511 A1* | 1/2014 | Xammar Bove | ............... | A62B 35/04 248/636 |
| 2014/0049957 A1* | 2/2014 | Goelz | ............... | F21V 29/763 362/235 |
| 2014/0192558 A1* | 7/2014 | Dau | ............... | G02B 6/0073 362/612 |
| 2015/0276169 A1* | 10/2015 | Bullard | ............... | F21V 5/04 362/235 |

\* cited by examiner

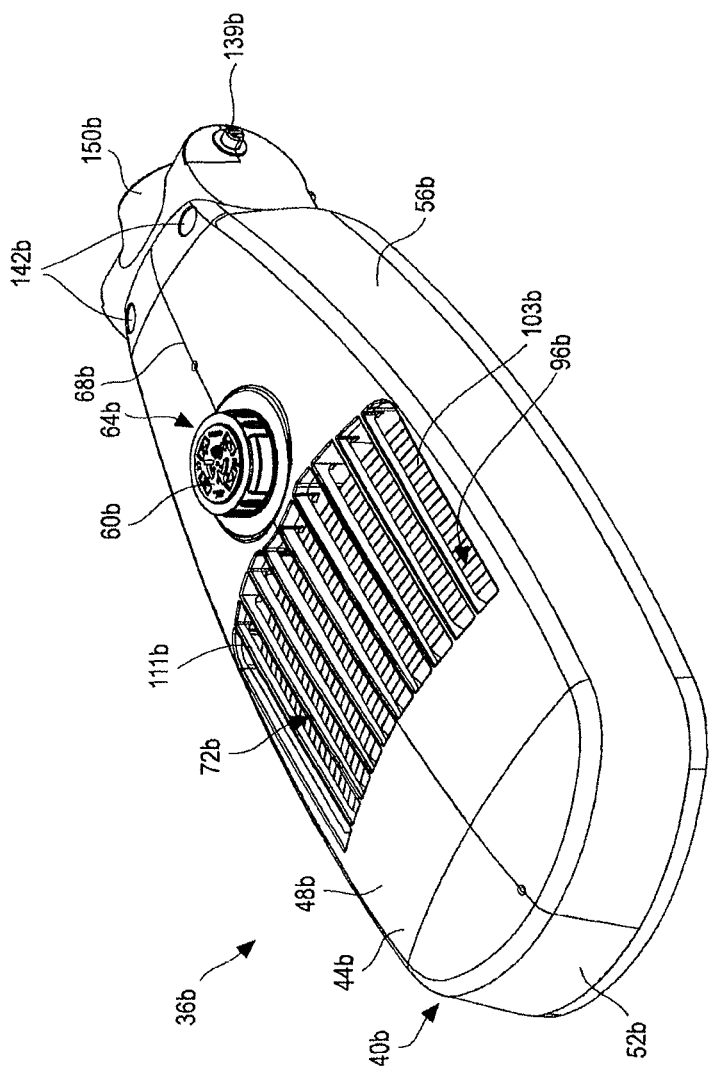

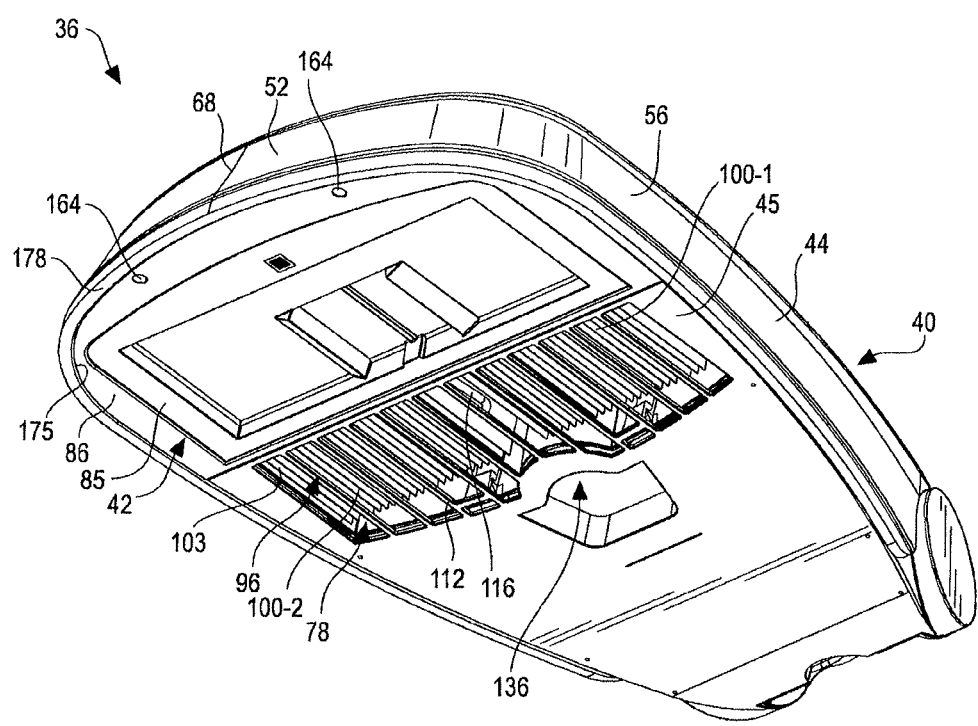

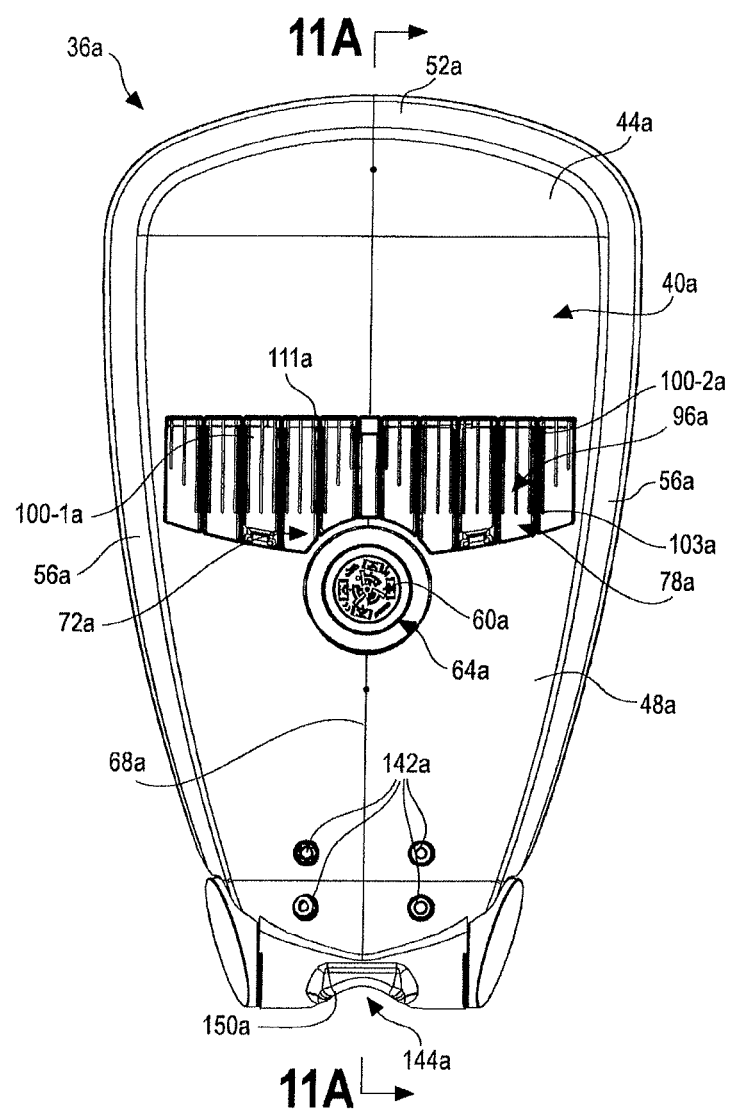

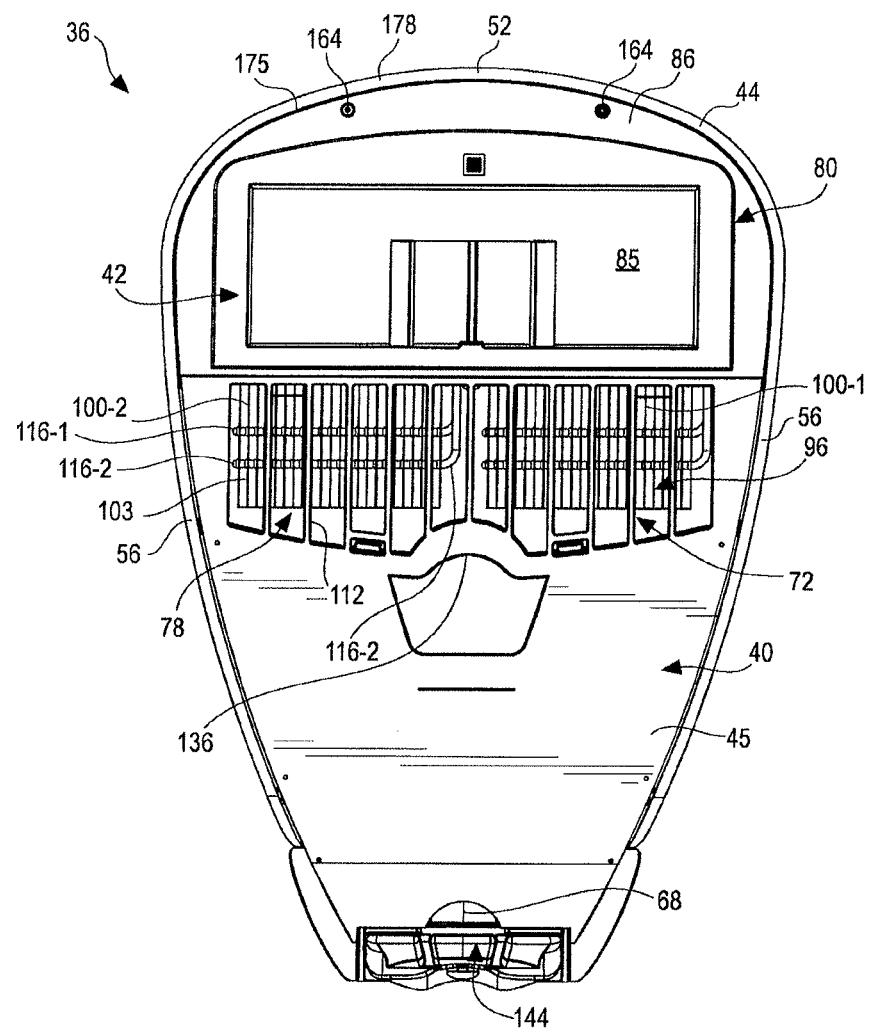

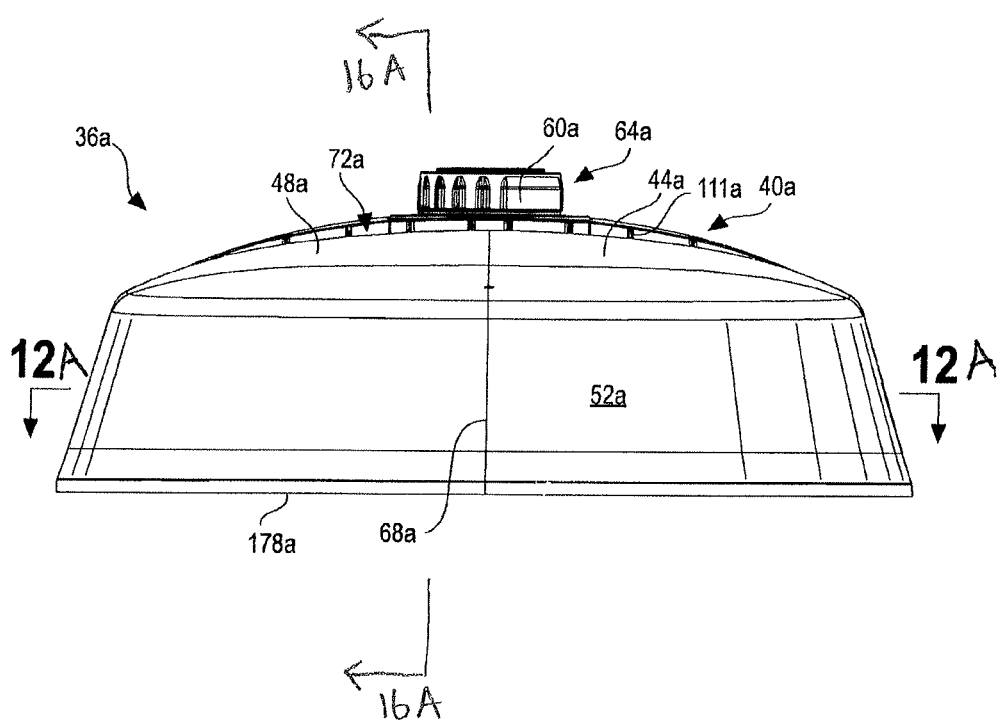

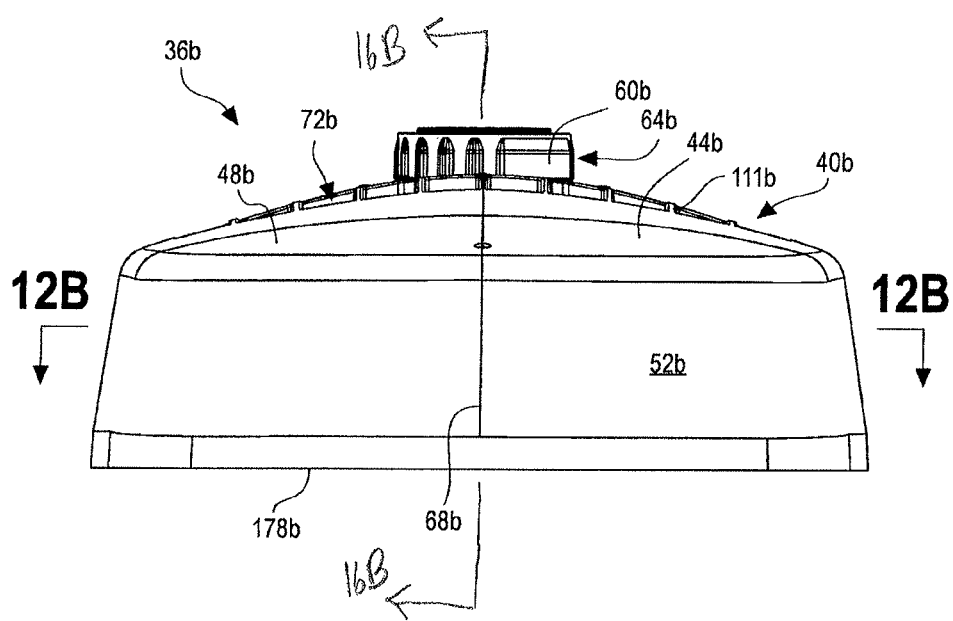

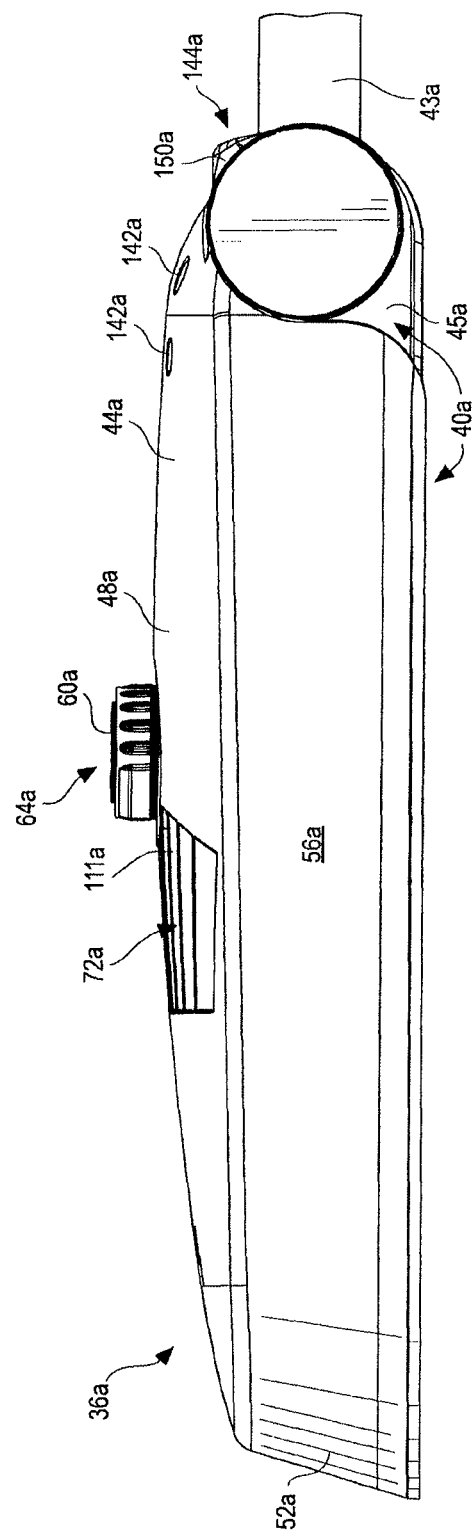

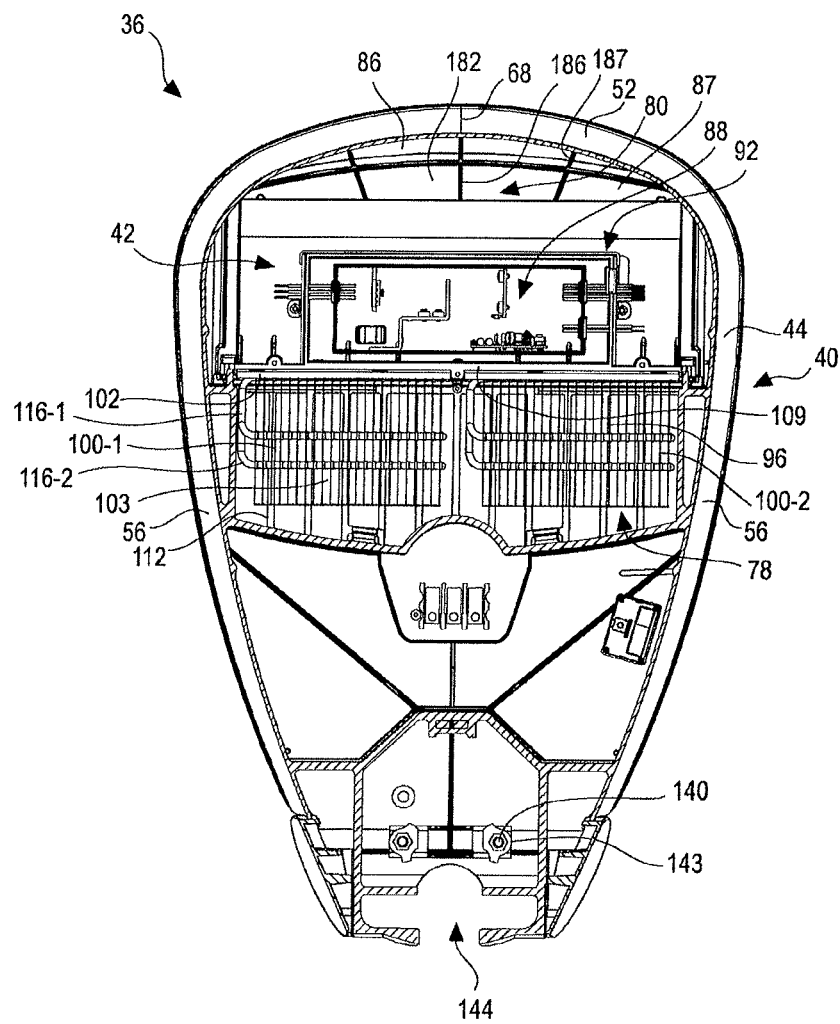

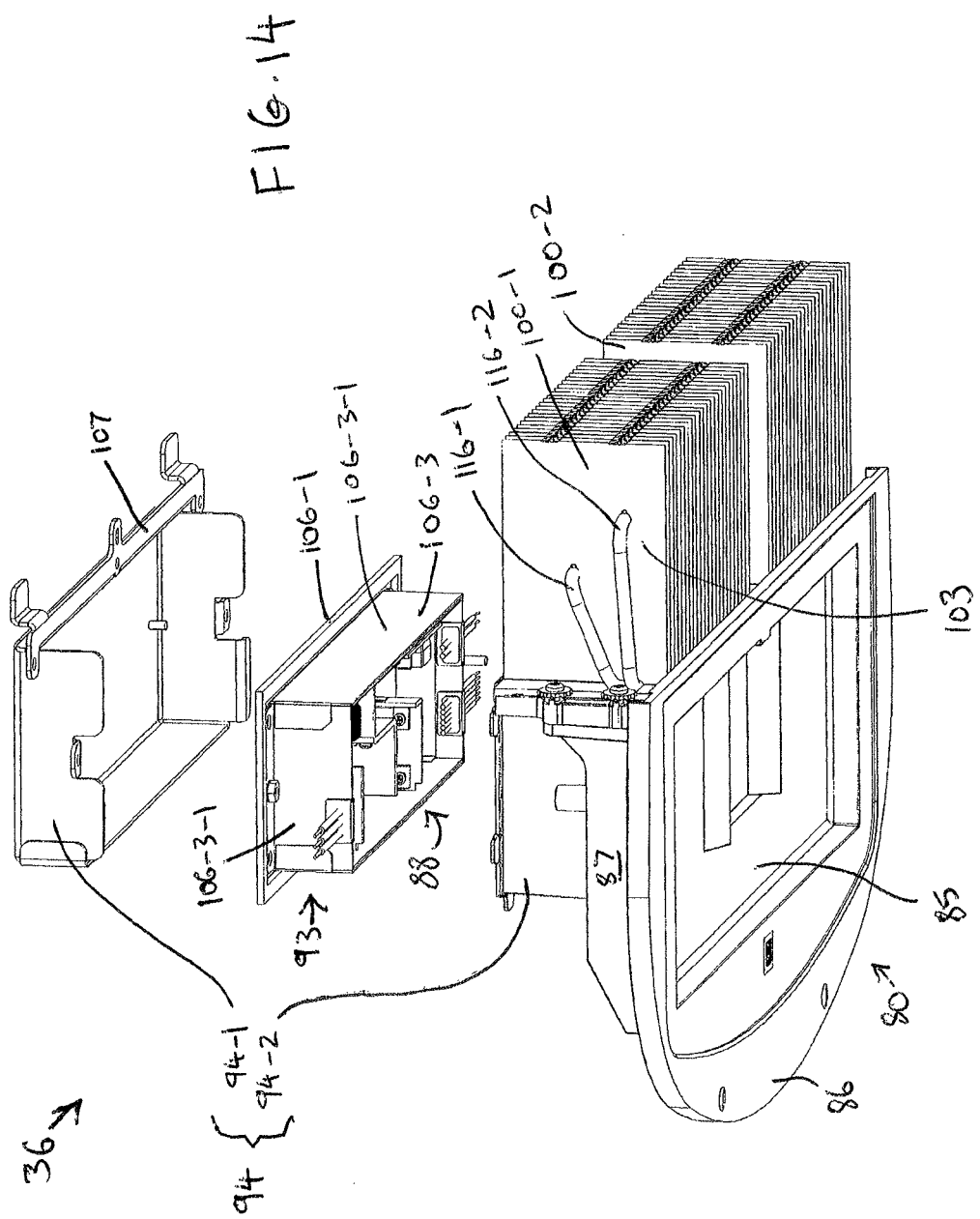

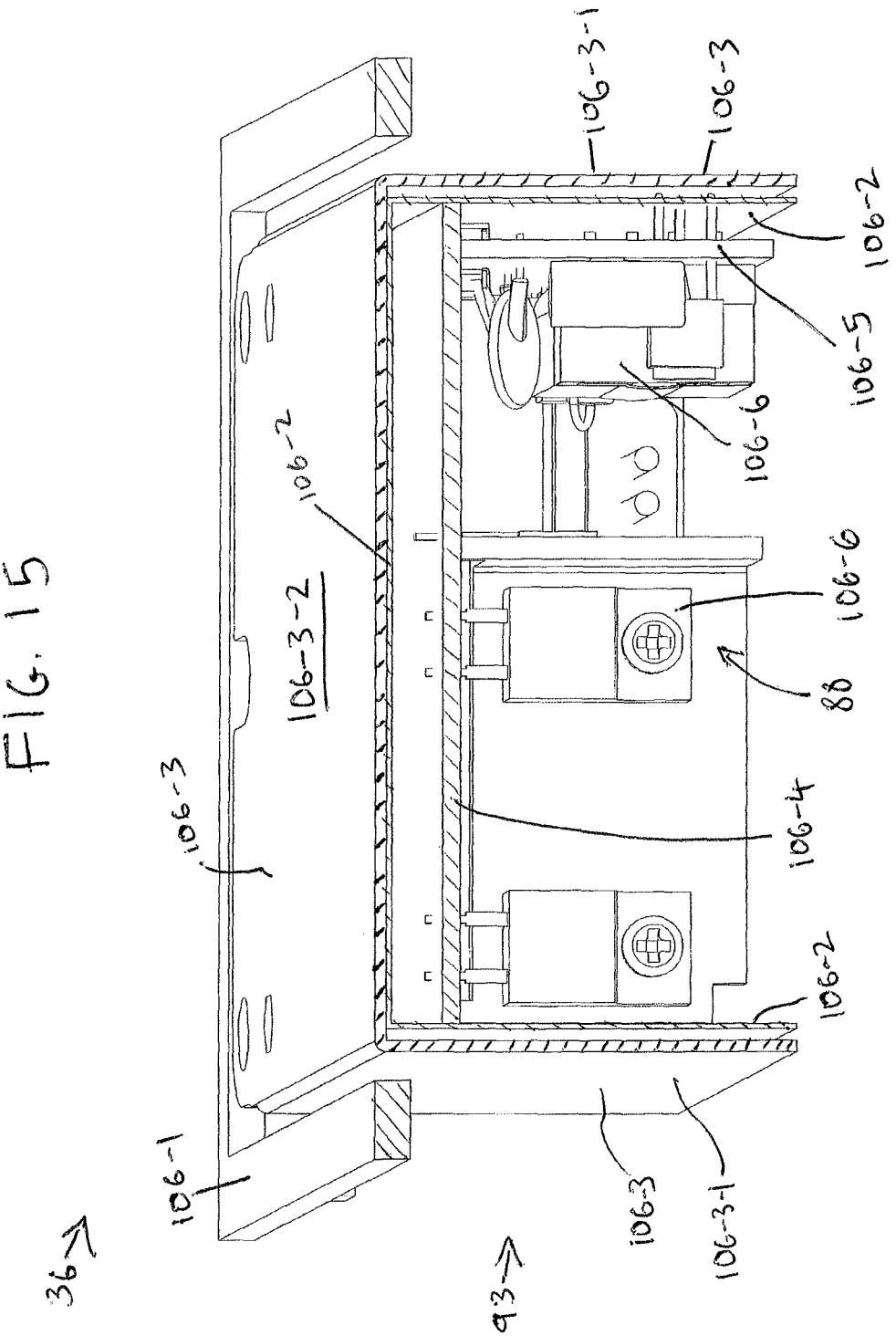

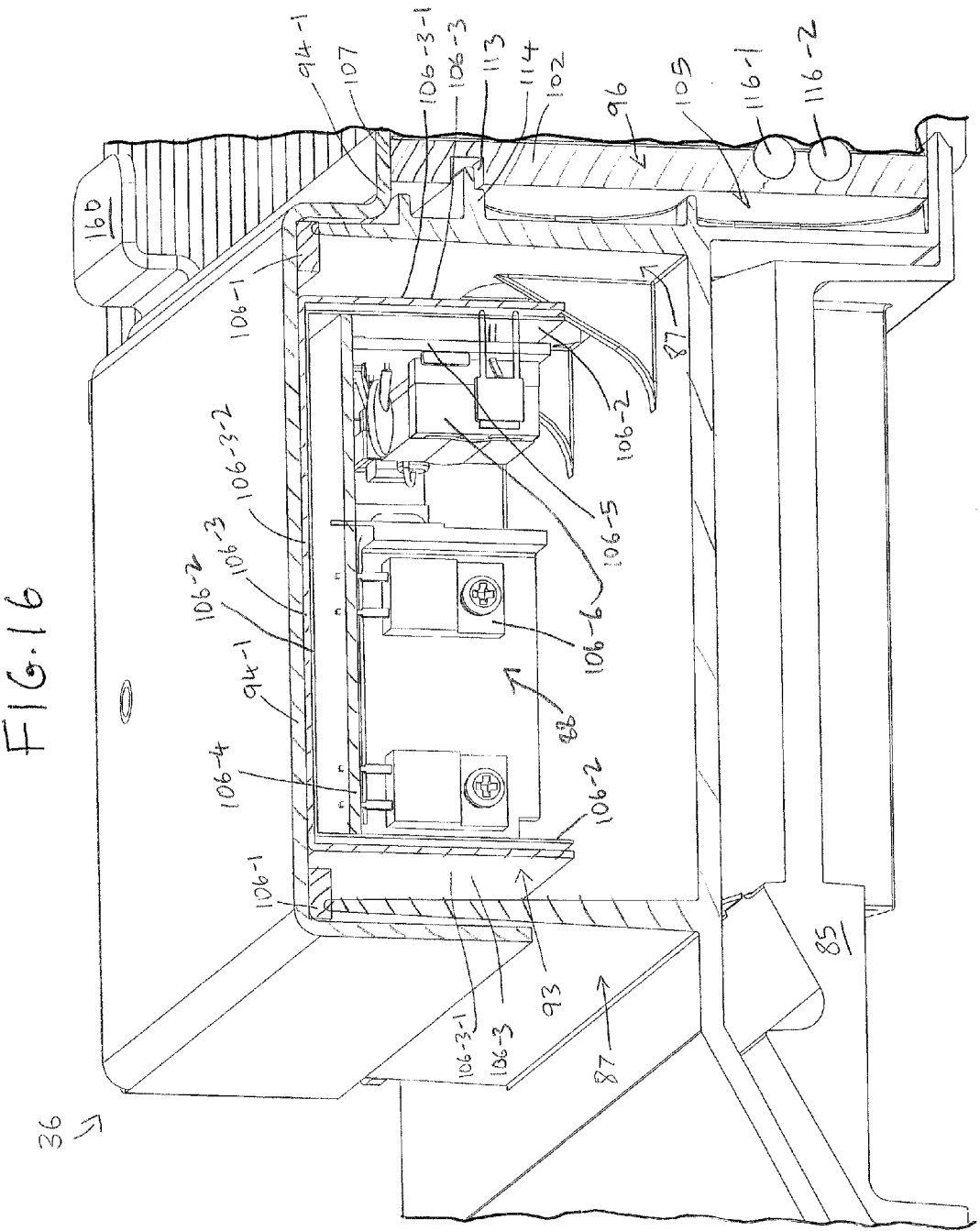

LUMINAIRE UTILIZING LIGHT EMITTING DIODES

The present application claims the benefit of U.S. Provisional Application No. 62/301,572, filed Feb. 29, 2016, entitled "Luminaire Utilizing Light Emitting Diodes", and further claims the benefit of U.S. Provisional Application No. 62/301,559, filed Feb. 29, 2016, entitled "Luminaire Utilizing Waveguide", and further comprises a continuation-in-part of International Application No. PCT/US2014/30017, filed Mar. 15, 2014, entitled "Optical Waveguide Body", and further comprises a continuation-in-part of U.S. Patent Application No. 14/485,609, filed Sep. 12, 2014, entitled "Luminaire Utilizing Waveguide", which claims the benefit of U.S. Provisional Patent Application No. 62/005,965, filed May 30, 2014, entitled "Luminaire Utilizing Waveguide", and further claims the benefit of U.S. Provisional Patent Application No. 62/025,436, filed Jul. 16, 2014, entitled "Luminaire Utilizing Waveguide", and further claims the benefit of U.S. Provisional Patent Application No. 62/025,905, filed Jul. 17, 2014, entitled "Luminaire Utilizing Waveguide", all owned by the assignee of the present application. The present application further comprises a continuation-in-part of U.S. patent application No. 14/657,988, filed Mar. 13, 2015, entitled "Luminaire Utilizing Waveguide", which claims the benefit of U.S. Provisional Patent Application No. 62/005,965, filed May 30, 2014, entitled "Luminaire Utilizing Waveguide", and further claims the benefit of U.S. Provisional Patent Application No. 62/025,436, filed Jul. 16, 2014, entitled "Luminaire Utilizing Waveguide", and further claims the benefit of U.S. Provisional Patent Application No. 62/025,905, filed Jul. 17, 2014, entitled "Luminaire Utilizing Waveguide", all owned by the assignee of the present application. The present application further comprises a continuation-in-part of U.S. Design Patent Application No. 29/496,754, filed Jul. 16, 2014, entitled "Roadway Luminaire", owned by the assignee of the present application and the disclosure of which is incorporated by reference herein. U.S. Provisional Application No. 62/301,572, filed Feb. 29, 2016, entitled "Luminaire Utilizing Light Emitting Diodes", U.S. Provisional Application No. 62/301,559, filed Feb. 29, 2016, entitled "Luminaire Utilizing Waveguide", International Application No. PCT/US2014/30017, filed Mar. 15, 2014, entitled "Optical Waveguide Body", U.S. patent application No. 14/485,609, filed Sep. 12, 2014, entitled "Luminaire Utilizing Waveguide", and U.S. patent application No. 14/657,988, filed Mar. 13, 2015, entitled "Luminaire Utilizing Waveguide" are all owned by the assignee of the present application and the disclosures thereof are incorporated by reference herein.

FIELD OF DISCLOSURE

The present subject matter relates to luminaires, and more particularly, to luminaires utilizing light emitting diodes (LEDs). The present subject matter also relates to the components of a luminaire including, but not limited to, a heat exchanger, an LED driver circuit, and a luminaire housing.

BACKGROUND

An LED luminaire typically includes a plurality of LEDs that serve as light sources, an LED driver circuit to regulate voltage and current that reaches the LEDs, a heat exchanger to transfer heat generated by the LEDs, and a luminaire housing. The luminaire may further include an optical waveguide that controls the distribution of light. The luminaire is typically mounted on a stanchion or pole. A durable luminaire that efficiently produces a high luminous flux is desirable in many applications. One issue with luminaires that produce a high luminous flux may be that the LEDs and some other components may produce excessive heat that may result in the LEDs having a short life, inasmuch as the life of an LED is inversely related to junction temperature.

In other applications, such as outdoor roadway, street, or parking lot lighting, it may be desirable to illuminate certain regions surrounding a light fixture while maintaining relatively low illumination of neighboring regions thereof. For example, along a roadway, it may be preferred to direct light in a direction parallel with the roadway while minimizing illumination in a direction toward roadside houses. For such and other applications, a luminaire that allows for easy adjustability and easy replacement of the luminaire and components thereof may be desirable. It may be difficult, however, to ensure that such a technician-friendly luminaire is structurally sound and can bear the stresses and elements that impact a typical luminaire, particularly one that is exposed to weather and other outdoor influences.

SUMMARY

According to one aspect, a luminaire comprises a luminaire housing, at least one LED disposed within the luminaire housing, and an LED driver circuit disposed within a driver housing. The driver housing comprises an inner portion and an outer portion, wherein at least a part of the inner portion is disposed between the LED driver circuit and the outer portion and wherein the LED driver circuit is in thermal communication with the outer portion.

According to another aspect, a luminaire comprises a luminaire housing, at least one LED disposed within the luminaire housing, and an LED driver circuit disposed within a driver housing. The driver housing comprises an inner portion and an outer portion, wherein at least a part of the inner portion is disposed between the LED driver circuit and the outer portion, and wherein the LED driver circuit is in thermal communication with the outer portion. Further, a heat exchanger is disposed in thermal communication with the at least one LED.

According to yet another aspect, a luminaire comprises a luminaire housing that comprises a top housing portion and a bottom housing portion and a head assembly coupled to the top housing portion. The head assembly is at least partially enclosed by the luminaire housing and comprises a bottom surface adjacent to the bottom housing portion The head assembly further comprises an optical assembly comprising an optical waveguide, at least one LED adjacent the optical waveguide, an LED driver circuit disposed within a driver housing, and a heat exchanger in thermal communication with the at least one LED, wherein the driver housing comprises an inner portion and an outer portion.

Other aspects and advantages will become apparent upon consideration of the following detailed description and the attached drawings wherein like numerals designate like structures throughout the specification.

BRIEF DESCRIPTION OF THE DRAWINGS

FIGS. 1, 1A, and 1B are top isometric views of alternative embodiments of a luminaire, with FIG. 1 illustrating a large luminaire, FIG. 1A illustrating a medium-sized luminaire, and FIG. 1B illustrating a small luminaire;

FIGS. 2 and 2A are bottom isometric views of the alternative embodiments of a luminaire seen in FIGS. 1 and 1A, respectively;

FIGS. 6 and 6A are plan views of the alternative embodiments seen in FIGS. 1 and 1A, respectively;

FIGS. 7 and 7A are bottom elevational views of the alternative embodiments seen in FIGS. 1 and 1A, respectively;

FIGS. 8, 8A, and 8B are front elevational views of the alternative embodiments seen in FIGS. 1, 1A, and 1B, respectively;

FIGS. 10 and 10A are side elevational views of the alternative embodiments seen in FIGS. 1 and 1A, respectively, illustrating a luminaire mounted on a stanchion;

FIGS. 12, 12A, and 12B are cross sectional views taken generally along lines 12-12 of FIG. 8, lines 12A-12A of FIG. 8A, and lines 12B-12B of FIG. 8B, respectively;

FIGS. 14 and 14A are further exploded isometric views illustrating the driver housing of the alternative embodiments seen in FIGS. 1 and 1A, respectively;

FIG. 15 is a cross-sectional isometric view taken generally along lines 16-16 of FIG. 8 of a portion of the driver housing of the embodiment of FIG. 1;

FIGS. 16, 16A, and 16B are enlarged cross sectional views taken generally along lines 16-16 of FIG. 8, lines 16A-16A of FIG. 8A, and lines 16B-16B of FIG. 8B, respectively, illustrating a driver housing;

DETAILED DESCRIPTION

Figure 1:
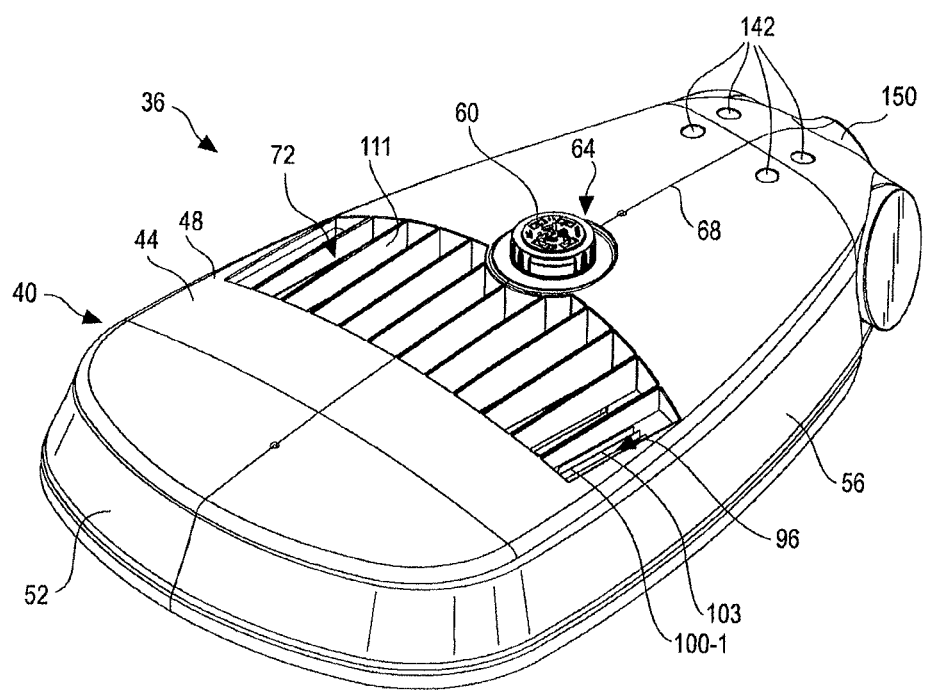
Figure 1A:
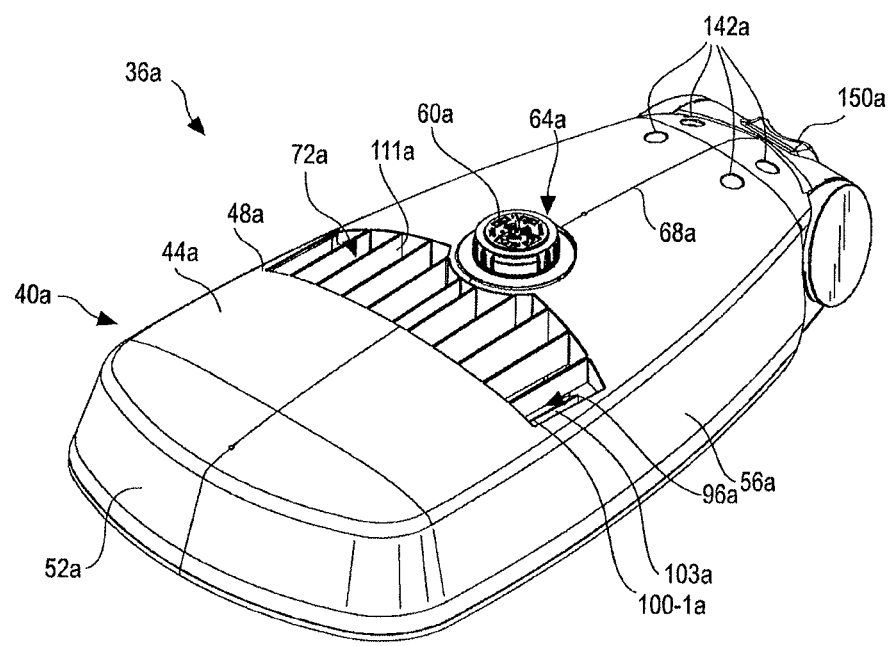

FIG. 1 shows a luminaire 36 that may be a relatively large luminaire compared to a relatively smaller, medium-sized luminaire 36a of FIG. 1A. The medium-sized luminaire may, in turn, be relatively large compared to a small luminaire 36b of FIG. 1B. In general, figure numbers without "A" or "B" refer to the large luminaire 36 (FIGS. 1, 2, 3, etc.), figure numbers ending in "A" refer to the medium-sized luminaire 36a (FIGS. 1A, 2A, 3A, etc.), and figure numbers ending in "B" refer to the small luminaire 36b (FIGS. 1B, 8B, 12B, 13B, and 16B). Further, it should be noted that a reference numeral that ends in "a" generally refers to a component of the medium-sized luminaire 36a that is analogous (i.e., similar or identical) to a component of the large luminaire 36, except for size and as otherwise noted herein or as otherwise shown in the FIGS. (e.g., 40a refers to a luminaire housing of the medium-sized luminaire 36a whereas 40 refers to a luminaire housing of the large luminaire 36). Similarly, a reference numeral that ends in "b" generally refers to a component of the small luminaire 36b that is analogous to a component of the large luminaire 36, except for size and as otherwise noted herein or as other shown in the FIGS. Besides the three illustrated embodiments, other embodiments of the luminaire may comprise one or more of the components of the three illustrated embodiments, possibly without certain other components of the three illustrated embodiments. In general, the description of the large luminaire 36 herein should be treated as a description that applies to the large luminaire 36, the medium-sized luminaire 36a, and the small luminaire 36b, unless otherwise indicated herein or in the FIGS.

Figure 3:
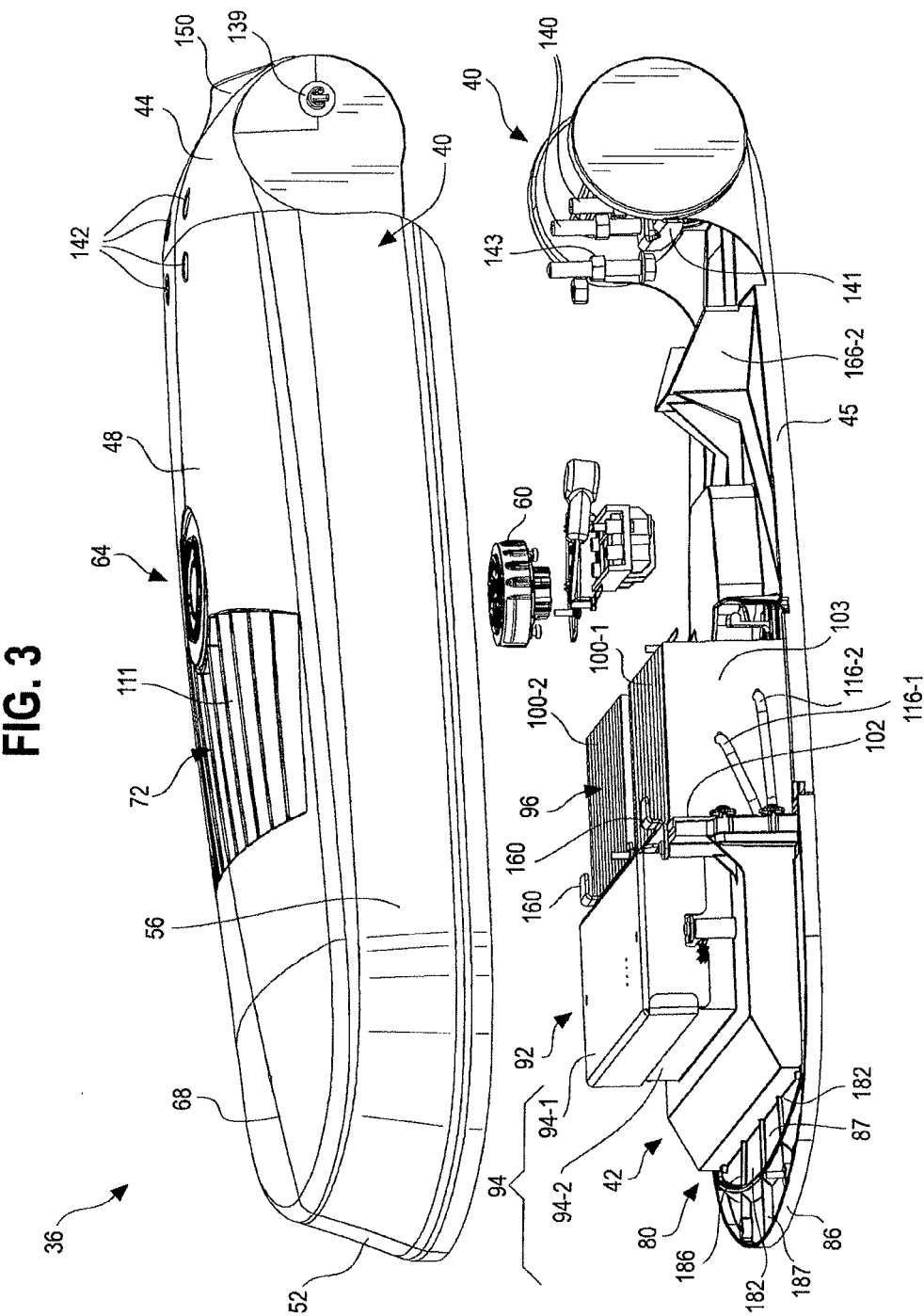
FIGS. 3 and 3A are exploded isometric views of the alternative embodiments of a luminaire seen in FIGS. 1 and 1A, respectively.
Figure 3A:
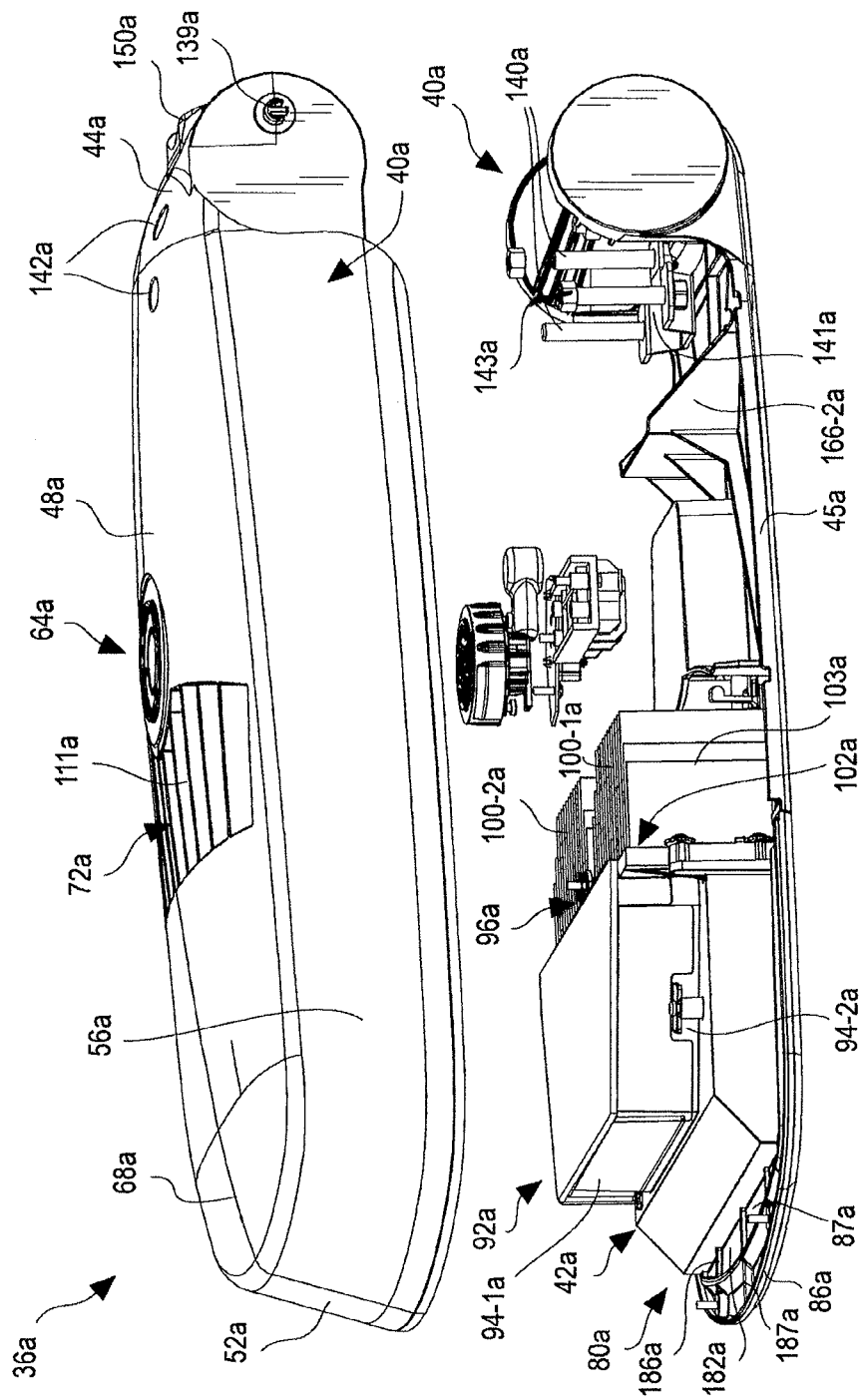
Figure 10:
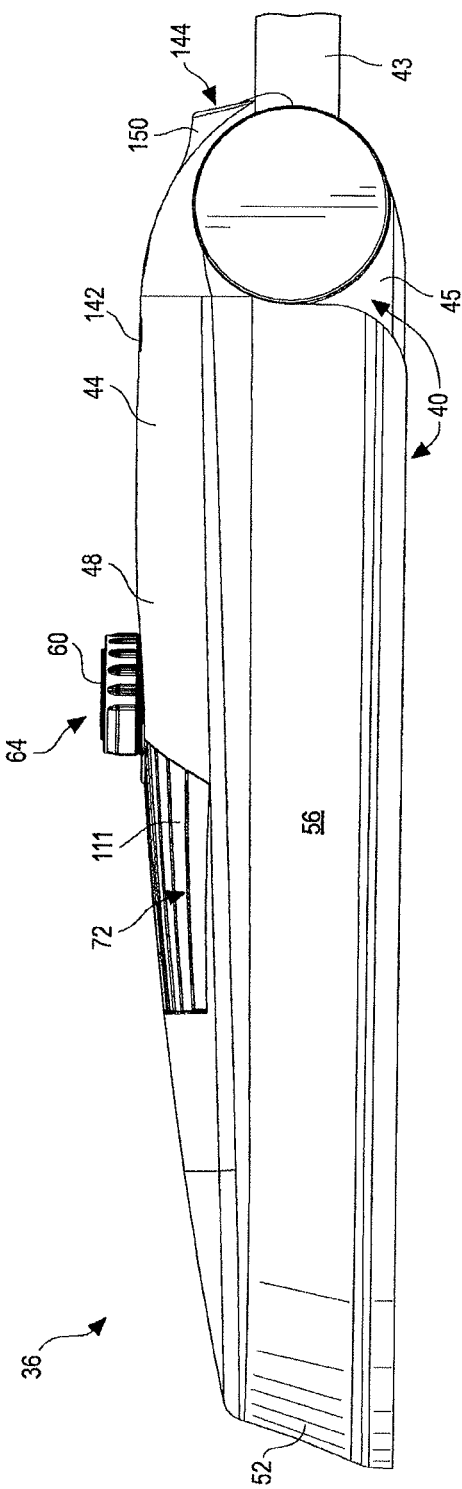

As shown in FIGS. 3 and 3A, the luminaire 36 comprises a luminaire housing 40 and a head assembly 42. In general, the luminaire 36 is capable of being mounted on a stanchion or pole 43 as shown in FIGS. 10 and 10A. Referring again to FIGS. 3 and 3A, the luminaire housing 40 comprises a top housing portion 44 and a bottom housing portion 45. As further shown, the top housing portion 44 comprises a top surface 48, a front wall 52, and side walls 56. As shown in FIGS. 1, 1A, and 1B, a light sensor 60 is disposed in a receptacle 64 of the top housing portion 44. The receptacle 64 is preferably aligned with a longitudinal center plane 68 of the luminaire 36. An upper convection opening 72 is disposed between the receptacle 64 and the front wall 52. In the illustrated embodiments (i.e., in the large, medium, and small luminaires 36, 36a, and 36b), the opening 72 occupies substantially the entire width of the luminaire 36, although this need not be the case.

Figure 2A:
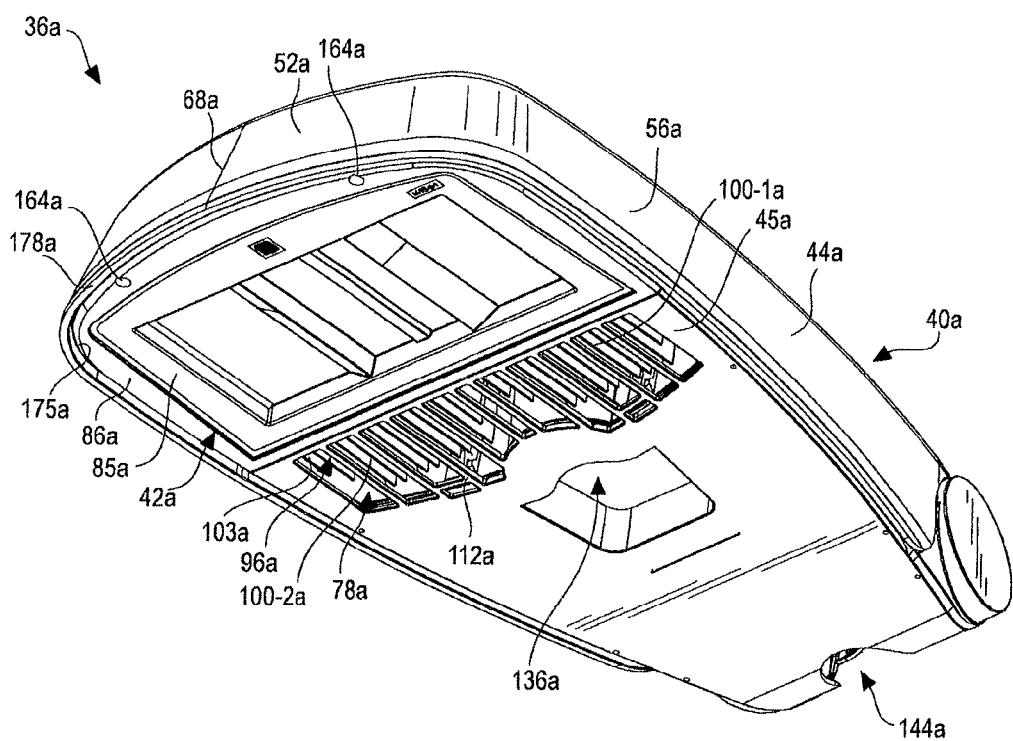

Referring now to FIGS. 2 and 2A, the bottom housing portion 45 comprises a lower convection opening 78 disposed below the upper convection opening 72. In the illustrated embodiments, the lower convection opening 78 occupies substantially the entire width of the luminaire 36, although this need not be the case.

In the illustrated embodiment, the large luminaire 36 may be approximately 740.19 mm in length, 497.87 mm in width, and 161.52 mm in height. Further, in the illustrated embodiment, the medium-sized luminaire 36a may be approximately 667.90 mm in length, 390.59 mm in width, and 150.27 mm in height. Further, in the illustrated embodiment, the small luminaire 36b may be approximately 639.16 mm in length, 284 mm in width, and 127.45 mm in height.

Referring now to FIGS. 3, 3A, 5, and 5A, the head assembly 42 is at least partially enclosed by the luminaire housing 40 and comprises an optical assembly 80 and a plurality of LEDs 84 disposed adjacent the optical assembly 80. The optical assembly 80 comprises an optical waveguide 85 disposed adjacent the LEDs 84, a lower frame member 86 partially surrounding the optical waveguide 85 and forming a barrier between the optical waveguide 85 and the luminaire housing 40, and an upper frame member 87 disposed above the optical waveguide 85. The head assembly 42 further comprises an LED driver circuit 88 and a driver housing 92. A reflective bottom surface of the upper frame member 87 is disposed adjacent one or more upper surfaces of the optical waveguide 85. Further details of the optical waveguide 85 are disclosed in co-pending application Ser. No. 15/060,354, entitled "Luminaire Utilizing Waveguide" filed herewith, the disclosure of which is hereby incorporated herein.

Figure 13:
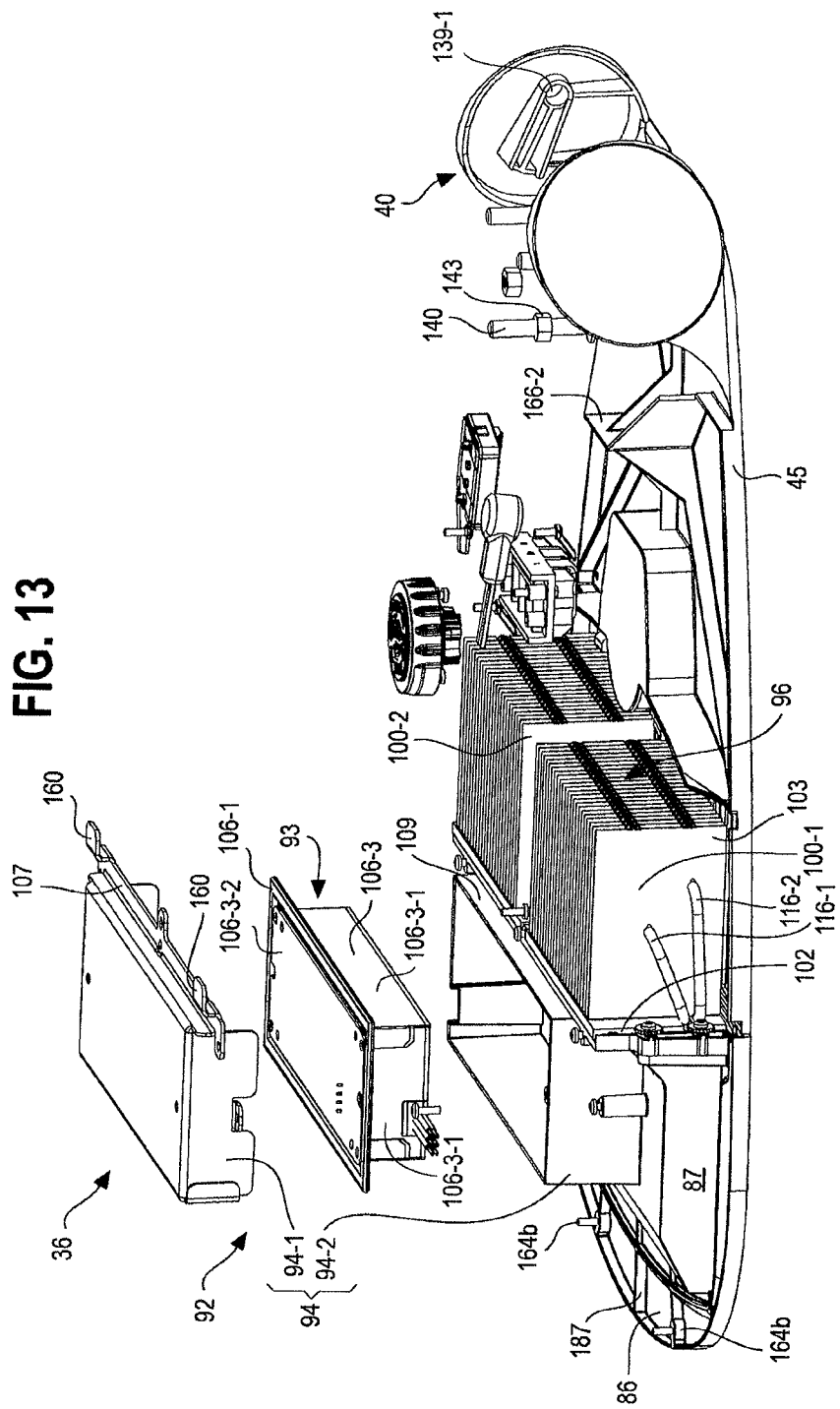
FIGS. 13, 13A, and 13B are exploded isometric views illustrating a driver housing of the alternative embodiments seen in FIGS. 1, 1A, and 1B, respectively.
Figure 13A:
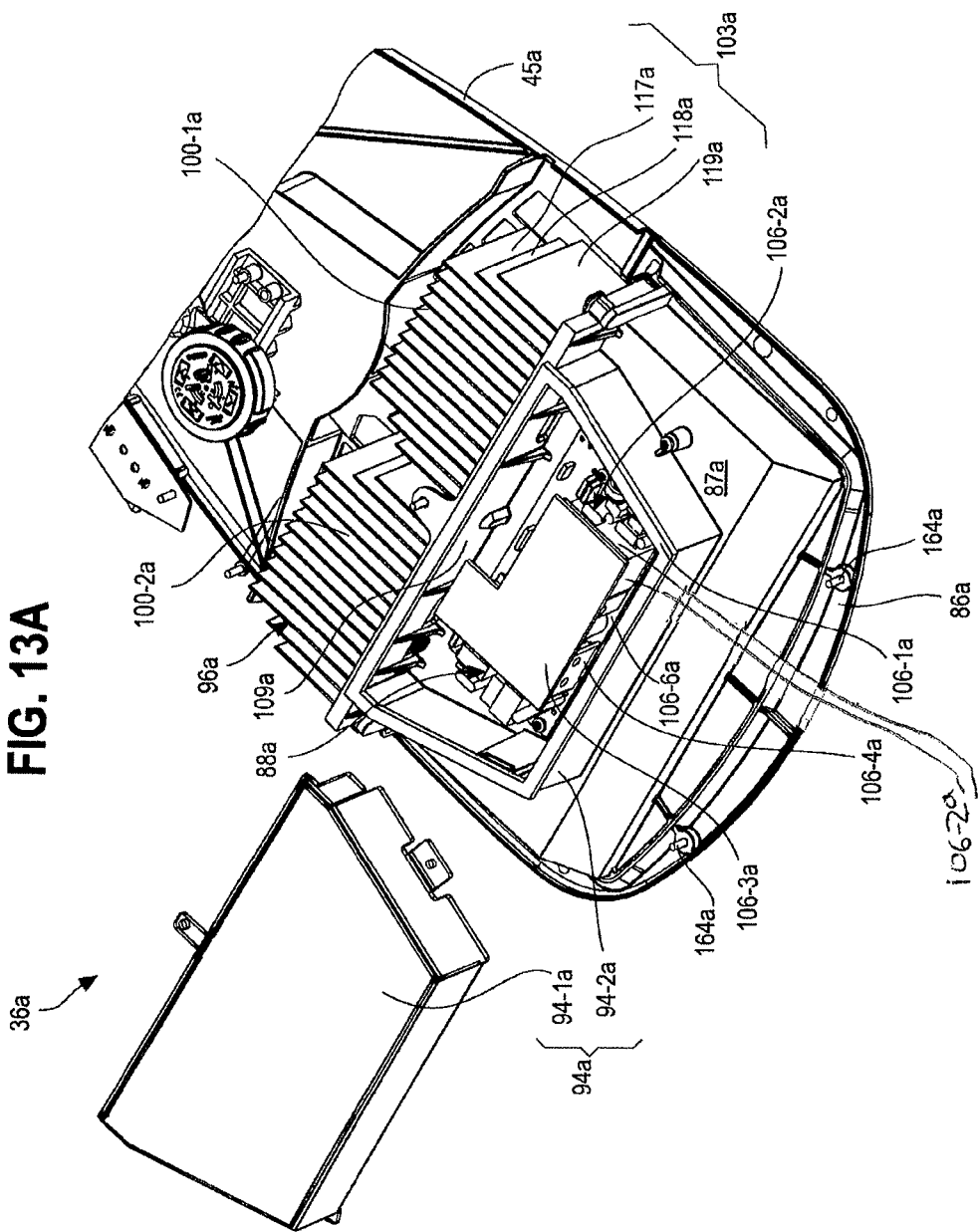

As shown in FIGS. 13, 13A, 14, and 14A, an LED driver circuit 88 is disposed in the driver housing 92, which is disposed proximal to and above the plurality of LEDs 84. As shown in FIGS. 13 and 13A, the driver housing 92 comprises an inner portion 93 and an outer portion 94, with at least a part of the inner portion 93 disposed between the LED driver circuit 88 and the outer portion 94. The outer portion 94 comprises an upper portion 94-1 and a lower portion 94-2. The upper portion 94-1 forms a top cover of the driver housing 92 and is made of a metal capable of efficient heat transfer. The lower portion 94-2 may be integral with the upper frame member 87 and may form the side walls and bottom wall of the driver housing 92. The lower portion 94-2 may be made of a polycarbonate material. In the illustrated embodiments, the upper portion 94-1 may be disposed above substantially the entire lateral dimensions of the LED driver circuit 88, as noted in detail hereinafter. Because the upper portion 94-1 has a large surface area that covers substantially the entire lateral dimensions of the LED driver circuit 88, the upper portion 94-1 can efficiently transmit heat developed by the LED driver circuit 88 out of the housing 92.

As further shown by FIGS. 13 and 13A, the heat exchanger 96 is included in the head assembly 42. The heat exchanger 96 comprises one or more heat exchanger portions 100 (here shown as portions 100-1 and 100-2 that are present in the large and medium luminaires 36 and 36a), with at least one heat exchanger portion 100, and preferably, each comprising a base plate 102 and a plurality of fins 103. In the large luminaire 36 and the medium-sized luminaire 36a, the fins 103 are attached to and/or extend from the base plate 102. At least one of the fins 103 defines a plane that is preferably substantially or fully transverse (and more preferably, normal) to the bottom surface of the luminaire 36 and substantially or fully transverse (and more preferably, normal) to the base plate 102. The fins 103 are in thermal communication with the base plate 102. Further, in the illustrated embodiments, the base plate 102 transfers heat to the fins 103 that, in turn, transfer heat at least by convection through the upper and lower convection openings 72 and 78, as shown in FIGS. 1, 1A, 2, and 2A.

As further shown in FIGS. 13 and 13A, the base plate 102 is in thermal communication (via conduction, convection, and/or radiation) with at least one LED 84. Optionally, in the large luminaire 36, the base plate 102 facilitates heat transfer from the LEDs 84 and the LED driver circuit 88 whereas in the medium-sized luminaire 36a, the base plate 102a facilitates heat transfer from the LEDs 84a (optionally, substantially all of the heat received by the upper portion 94-1a from LED driver circuit 88a is transferred from the upper portion 94-1a to the surrounding air within the luminaire 36a through convection), as described in detail below. As shown in FIG. 13, in the large luminaire 36, the base plate 102 is in thermal communication with the LED driver circuit 88, and/or a portion of the driver housing 92, as further described below.

Figure 5:
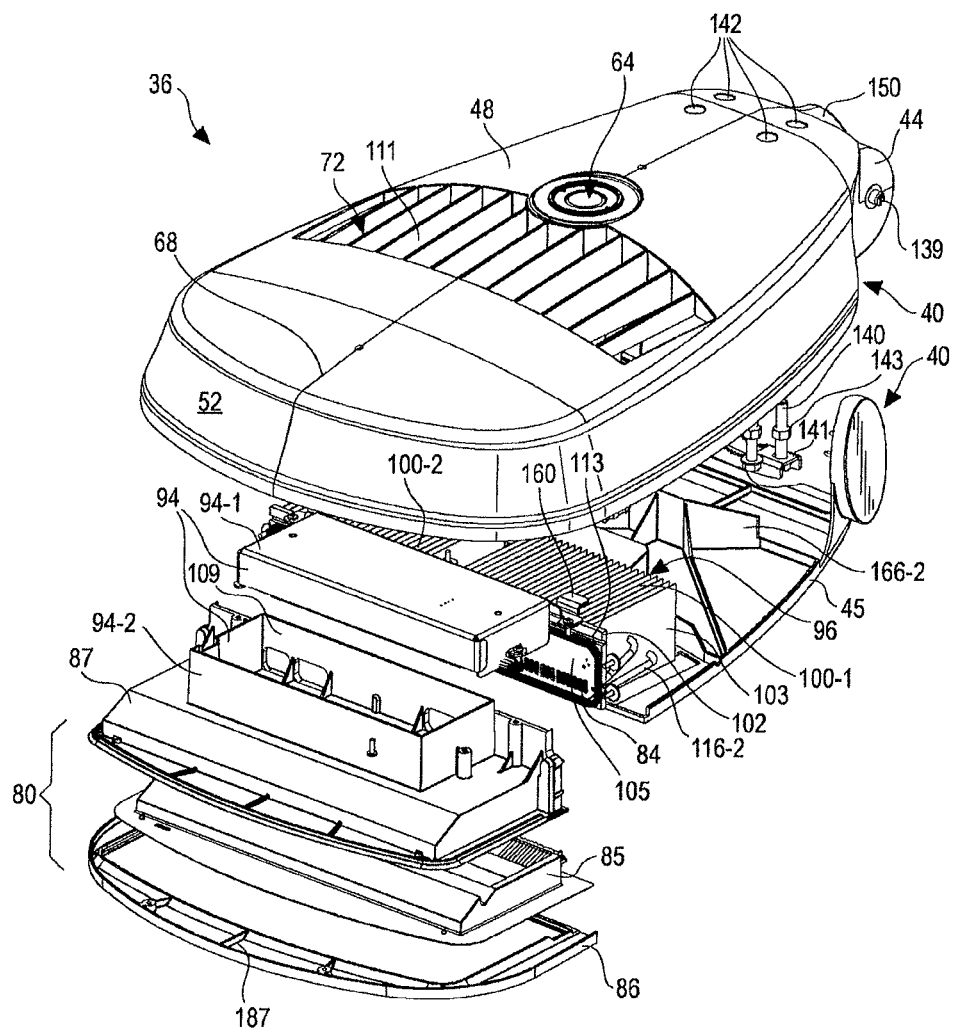
FIGS. 5 and 5A are further exploded isometric views of the alternative embodiments seen in FIGS. 1 and 1A, respectively.
Figure 5A:
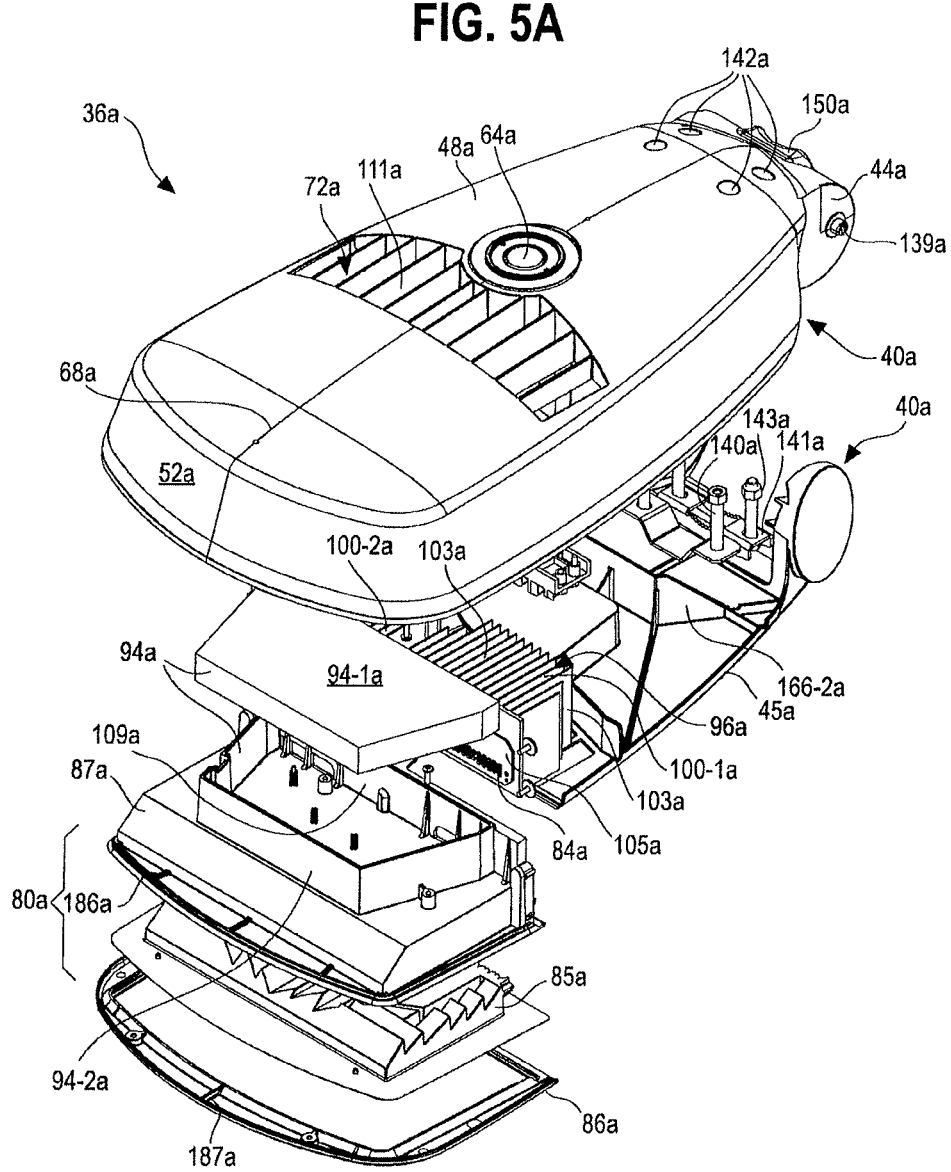

As shown in FIGS. 5 and 5A, one or more thermally conductive printed circuit boards (PCBs) 105 receive and mount the LEDs 84 and conduct heat therefrom. The PCBs 105 are preferably made of one or more materials that efficiently conduct heat and are disposed in thermal communication with the base plate 102. In the illustrated embodiment, the LEDs 84 are in contact with a front surface of the PCB 105 whereas a back surface of the PCB 105 is in contact with the base plate 102. Additionally, a front surface of the base plate 102 is preferably parallel to a back surface of at least one LED 84.

As further shown in FIG. 13, in the large luminaire 36, the base plate 102 is in thermal communication with the LED driver circuit 88 at least through the outer portion 94 of the driver housing 92. As further shown, in the large and medium luminaires 36 and 36a, the outer portion 94 comprises a perimeter member 106-1 disposed between and in contact with the upper portion 94-1 and the lower portion 94-2 of the outer portion 94 when the driver housing 92 is in an assembled state.

As shown in FIG. 15 the inner portion 93 of the large luminaire 36 comprises two inner housings 106-2 and 106-3. As further shown in FIG. 15, the LED driver circuit 88 comprises a first circuit board 106-4 disposed laterally and forming a part of a top of the LED driver circuit 88, a second circuit board 106-5 disposed vertically and forming a part of a side wall of the LED driver circuit 88, and one or more LED driver components 106-6 in contact with the first and second circuit boards 106-4 and 106-5. Optionally, the first inner housing 106-2 is an electrical insulator that insulates the second inner housing 106-3 from the LED driver components 106-6. A portion of the first circuit board 106-4, such as some or all of a perimeter, is in contact with an inner surface of at least one of the side walls of the first inner housing 106-2. The first circuit board 106-4 may be secured to the upper portion 94-1 and/or the second inner housing 106-3 in any suitable fashion such as a threaded boss and nut combination, a fastener and threaded aperture combination, or the like. Optionally, such securement may occur prior to potting, which is described below. The second circuit board 106-5 contacts (physically and/or electrically) a bottom surface of the first circuit board 106-4 and is secured thereto. The first inner housing 106-2 is at least partially enclosed by and nested within the second inner housing 106-3 by four side walls 106-3-1 and a top side 106-3-2 of the second inner housing 106-3.

As shown in FIG. 16, in the large luminaire 36, the top side 106-3-2 of the second inner housing 106-3 is in contact with a bottom surface of the upper portion 94-1 of the outer portion 94. The second inner housing 106-3 may be secured to the upper portion 94-1 in any suitable fashion such as a threaded boss and nut combination, a fastener and threaded aperture combination, or the like. Optionally, such securement may occur prior to potting, which is described below. The second inner housing 106-3 may be made of one or more thermally conductive materials, such as thermally conductive polymers, metal(s), or the like. A thermally conductive interstitial substance 106-7 may be disposed in the second inner housing 106-3 ("potting") to facilitate heat transfer by conduction between the LED driver components 106-6 and the second inner housing 106-3. The interstitial substance 106-7 is in contact with LED driver components 106-6 and the second inner housing 106-3. The interstitial substance 106-7 may be made of an epoxy potting material.

Referring now to FIG. 16, in the large luminaire 36, the upper portion 94-1 of the outer portion 94 preferably comprises a plate member 107, which contacts an upper surface of the base plate 102, thereby establishing a path for heat transfer from the LED driver components 106-6, to the interstitial substance 106-7, to the second inner housing 106-3, to the upper portion 94-1, and to the base plate 102, optionally at least by conduction at each step of heat transfer. The plate member 107 may be secured to the base plate 102 in any suitable fashion by, e.g., fasteners such as screws, bolts, or the like. Moreover, the plate member 107 is disposed laterally and need not be integral with the upper portion 94-1, but may be separate therefrom and secured thereto by fasteners, welding, brazing, etc.

Additionally or alternatively, heat transfer may occur by convection and/or radiation from the LED driver circuit 88 to the inner and outer portions 93 and 94.

Figure 14A:
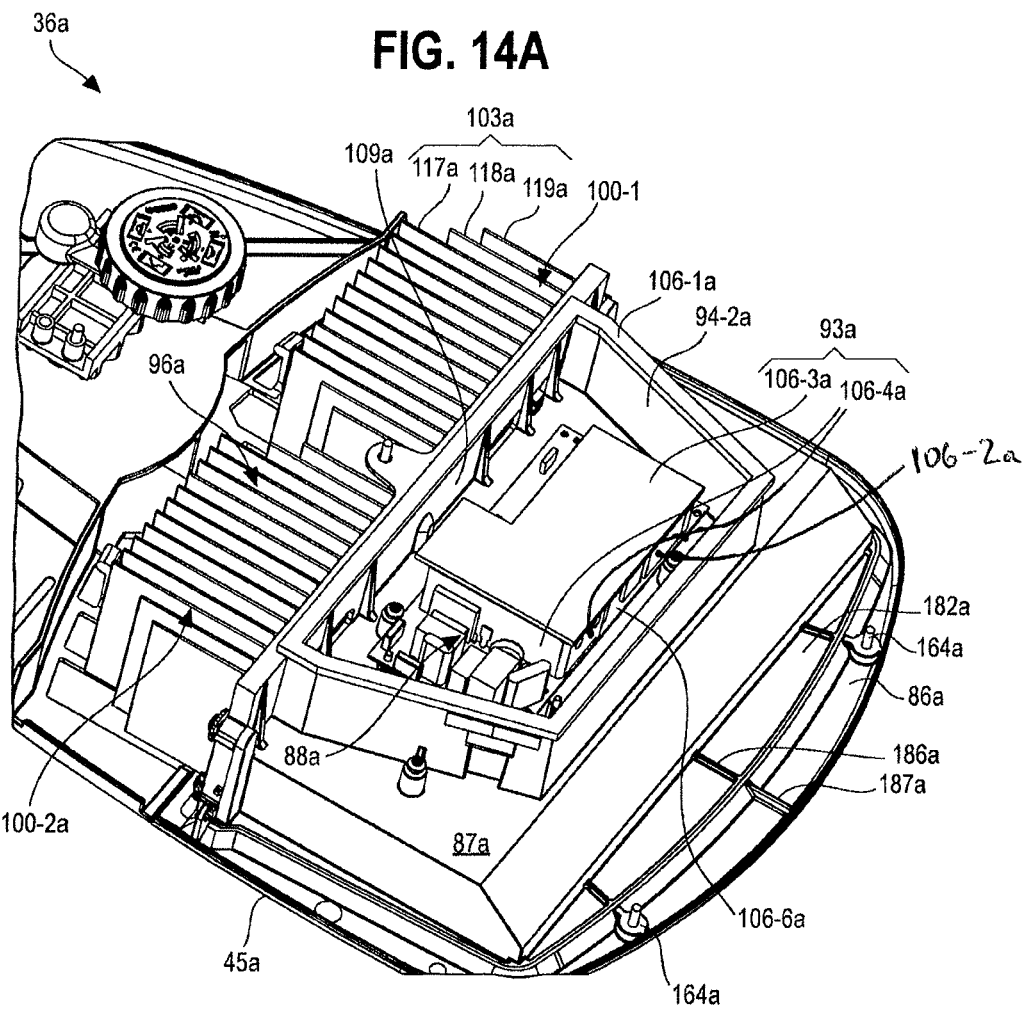
Figure 16A:
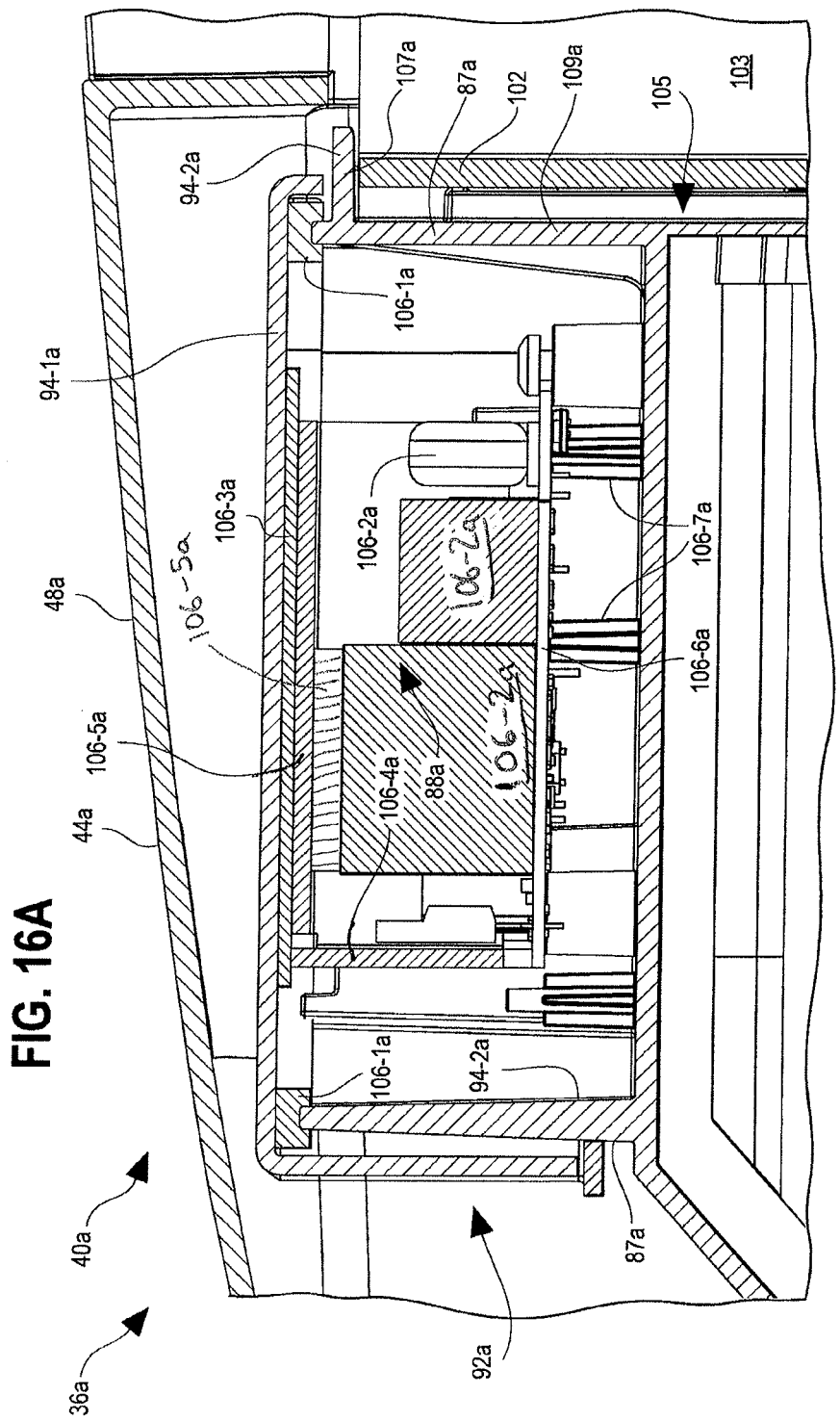

In the medium-sized luminaire 36a, as shown in FIG. 16A, one or more LED driver components 106-2a of the LED driver circuit 88a may be partially enclosed by the inner portion 93a, as shown in FIG. 14A. As further shown in FIGS. 14A and 16A, the inner portion 93a comprises a lateral top member 106-3a disposed above the LED driver components 106-2a, vertical side members 106-4a optionally disposed laterally from the LED driver components 106-2a, and one or more interface members 106-5a. The one or more interface members 106-5a may be in contact with the LED driver components 106-2a, the lateral top member 106-3a, and/or the vertical side members 106-4a, as shown in FIG. 16A. The vertical side members 106-4a may be made of metal to facilitate heat transfer. The lateral top member 106-3a and the interface members 106-5a may be made of thermally conductive material, such as a thermally conductive polymer.

As further shown in FIG. 16A, the lateral top member 106-3a is in contact with a bottom surface of the upper portion 94-1a of the outer portion 94a. Moreover, a top surface of the lateral top member 106-3a may have an L-shape, as shown in FIG. 13A. As further shown in FIG. 14A, a bottom surface of the vertical side members 106-4a contacts a circuit board 106-6a and a top surface of the vertical side members 106-4a contacts the lateral top member 106-3a. The circuit board 106-6a may be disposed below the LED driver components 106-2a and may be coupled thereto. The circuit board 106-6a is mounted above the lower portion 94-2a of the outer portion 94a by one or more studs 106-7a, as shown in FIG. 16A.

The driver housing 92a described above establishes a path for heat transfer from the LED driver components 106-2a to the inner portion 93a at least by conduction, to the upper portion 94-1a of the outer portion 94a at least by conduction, and to the surrounding air within and outside the luminaire at least by convection. Heat transfer from the LED driver components 106-2a to the upper portion 94-1 may occur optionally from the LED driver components 106-2a to the interface members 106-5a, to the lateral top member 106-3a, to the upper portion 94-1a, at least by conduction at each step. Additionally or alternatively, heat transfer may occur from the LED driver components 106-2a to the vertical side members 106-4a, to the lateral top member 106-3a, to the upper portion 94-1a, at least by conduction at each step. Additionally or alternatively, heat transfer may take place from the LED driver components 106-2a to the lateral top member 106-3a, to the upper portion 94-1a, at least by conduction at each step.

In some implementations, the perimeter member 106-1a between the upper and lower portions 94-1a and 94-2a may not be necessary. In such an implementation, the upper and lower portions 94-1a and 94-2a may be disposed in direct contact with one another.

As further shown in FIG. 16A, in the medium-sized luminaire 36a, the lower portion 94-2 of the outer portion 94 is integral with and/or comprises a plate member 107a that is disposed above an upper surface of the base plate 102a. The plate member 107a need not be integral with the lower portion 94-2a.

Alternative paths may be present for heat transfer between the LED driver circuit 88a and the upper portion 94-1a of the outer portion 94a, such as a combination of conduction, convection, and/or radiation, in addition to or as an alternative to the paths described above.

As shown in FIG. 16, in the large luminaire 36, the PCB 105 may be disposed adjacent a lower portion of the base plate 102 such that the PCB 105 is parallel to the base plate 102. Moreover, the base plate 102 is preferably parallel to a side 109 of the driver housing 92, as shown in FIG. 13. Such a placement of the PCB 105 and the driver housing 92 may be optimal for heat exchange because the LEDs 84 on the PCB 105 may produce substantially more heat than the LED driver circuit 88 enclosed by the driver housing 92 (e.g., the LEDs 84 may produce five to ten times the heat as the LED driver circuit). As the LEDs 84 are the larger heat emitter, dissipation of heat from the LEDs 84 is a priority. This is why the PCB 105 is disposed such that the entire (or at least a majority of the) back surface of the PCB 105 is in contact with the base plate 102—thus allowing for efficient heat transfer at least through conduction via a large surface area. Because the LED driver circuit 88 is the lesser heat emitter, the entire height of the driver housing 92 may not be in contact with the base plate 102 in one or more embodiments (i.e., the driver housing 92 may extend above and/or below the base plate 102, out of thermal contact with the base plate 102). As should be evident, prioritization of contact between the base plate 102 and the PCB 105 over contact between the base plate 102 and the driver housing 92 may be desirable in order to reduce the total size of the base plate 102. Moreover, it should be noted that the base plate 102 has sufficient thermal mass to conduct the combined heat developed by the LEDs 84 and the LED driver circuit 88 without overheating.

In the illustrated embodiments, the upper and lower convection openings 72 and 78 are disposed above and below, respectively, the fins 103 (when the luminaire 36 is mounted on a stanchion 43), thus providing for efficient heat transfer via a direct vertical path of convection flow (as shown in FIGS. 1, 1A, 2, and 2A, for example). In the large and medium luminaires 36 and 36a, one or more vanes 111 are disposed in an orientation parallel to the fins 103 and traverse the upper convection opening 72 (and/or the lower opening 78) in a longitudinal direction in order to facilitate air flow and obtain efficient heat transfer. In the illustrated embodiments, vanes 111 are omitted at the lower opening 78 and struts 112 instead traverse the lower opening 78, as shown in FIGS. 2 and 2A.

Referring now to FIG. 16, the large luminaire 36 includes a lateral channel 113 disposed on a front wall of the base plate 102. The lateral channel 113 may receive an elongate flange 114 protruding from the upper frame member 87 to ensure proper positioning of the base plate 102 and the upper frame member 87. The medium-sized luminaire 36a and the small luminaire 36b may not include a lateral channel or elongate flange.

Figure 12A:
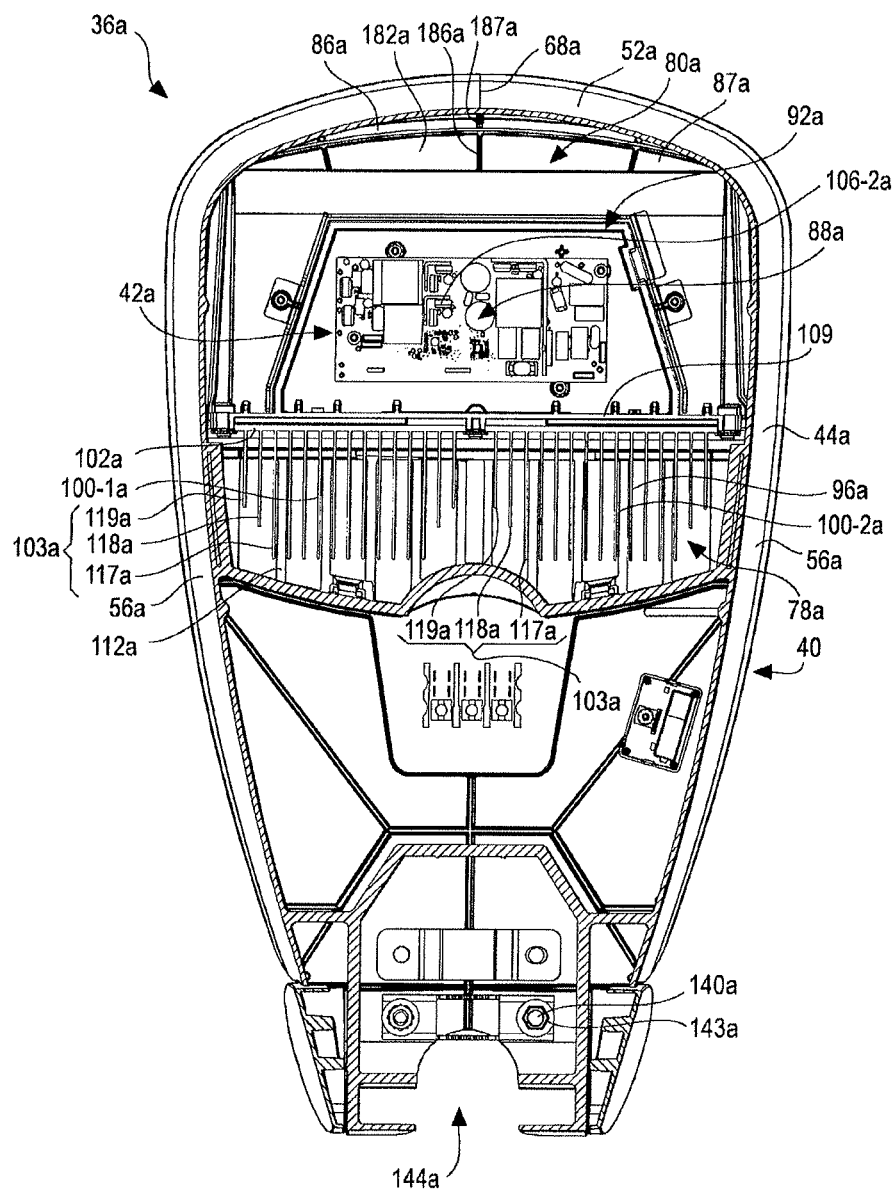

As further shown in the large and medium embodiments of FIGS. 12 and 12A, the heat exchanger 96 comprises a first heat exchanger portion 100-1 and a second heat exchanger portion 100-2 that is spaced horizontally or laterally apart from the first heat exchanger portion 100-1. The first and second heat exchanger portions 100-1 and 100-2 may occupy substantially the entire width of the luminaire 36, although this need not be the case. Moreover, first and second sets of LEDs 84-1 and 84-2 are spaced laterally apart from one another and are mounted on laterally separated first and second PCBs 105-1 and 105-2. As shown in FIGS. 5 and 5A, each heat exchanger portion 100 is associated with the first and second sets of LEDs 84-1 and 84-2, respectively, with the first heat exchanger portion 100-1 being adjacent to the first PCB 105-1 associated with the first set of LEDs 84-1 and the second heat exchanger portion 100-2 being adjacent to the second PCB 105-2 associated with the second set of LEDs 84-2. Such a distributed placement of LEDs 84 prevents excessive heat buildup in one part of the luminaire 36. Heat transfer from the first set of LEDs 84-1 to the first heat exchanger portion 100-1 may occur in parallel to the heat transfer from the second set of LEDs 84-2 to the second heat exchanger portion 100-2. Moreover, the heat exchanger portions 100-1 and 100-2 are disposed between the upper and lower convection openings 72 and 78.

Figure 6:
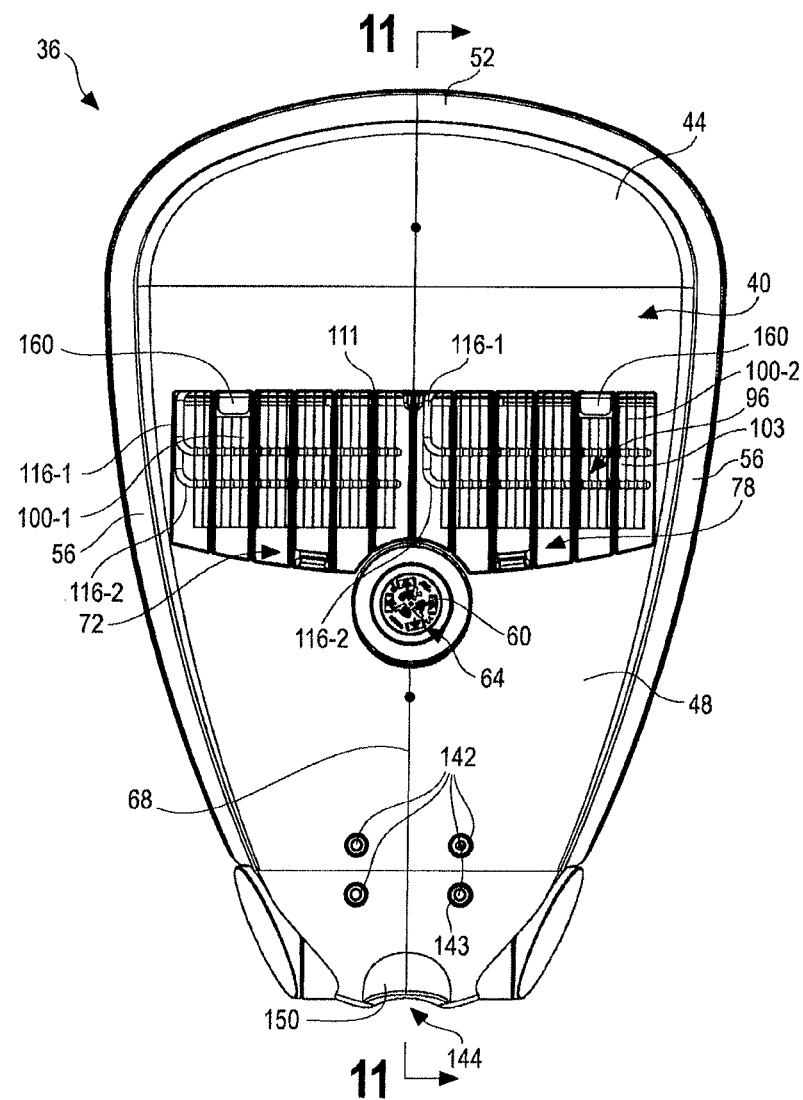
Figure 7A:
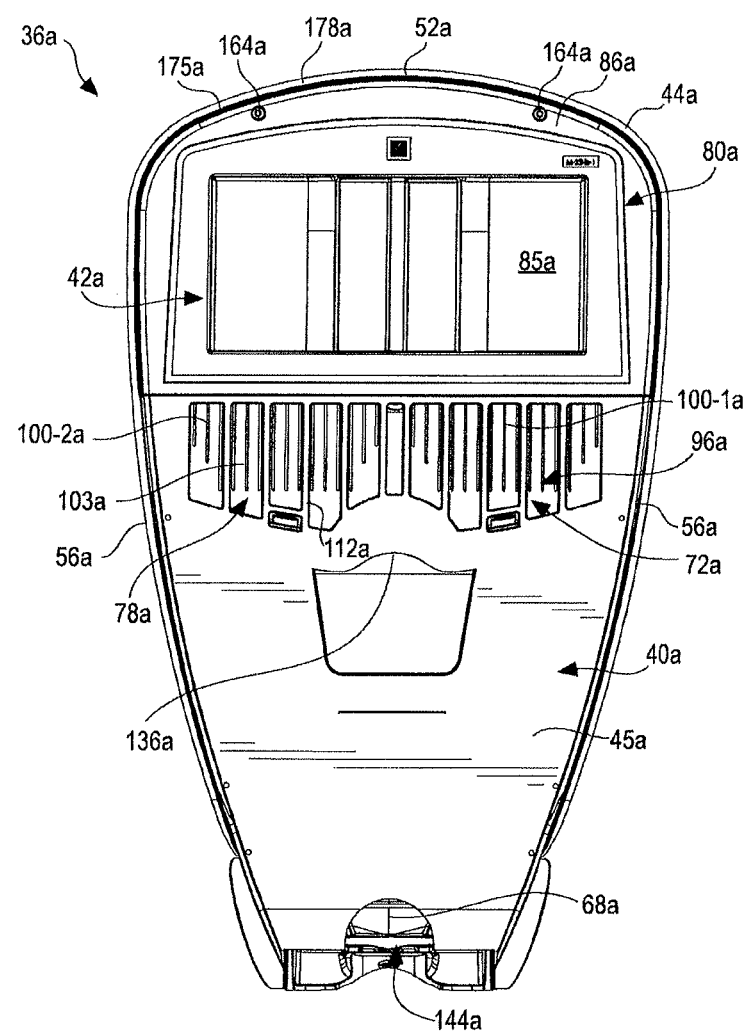
Figure 8:
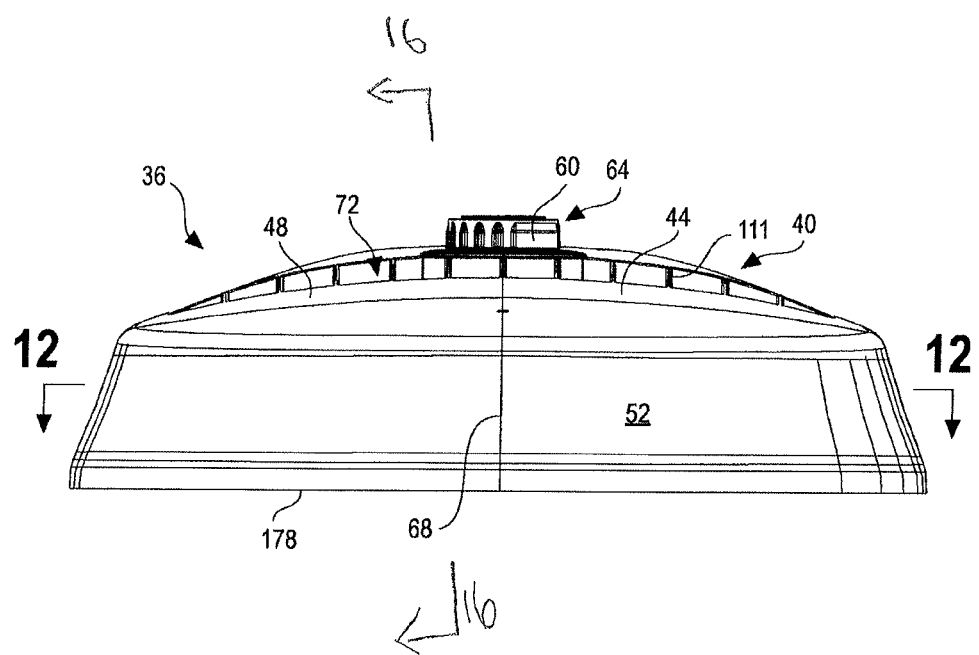
Figure 11:
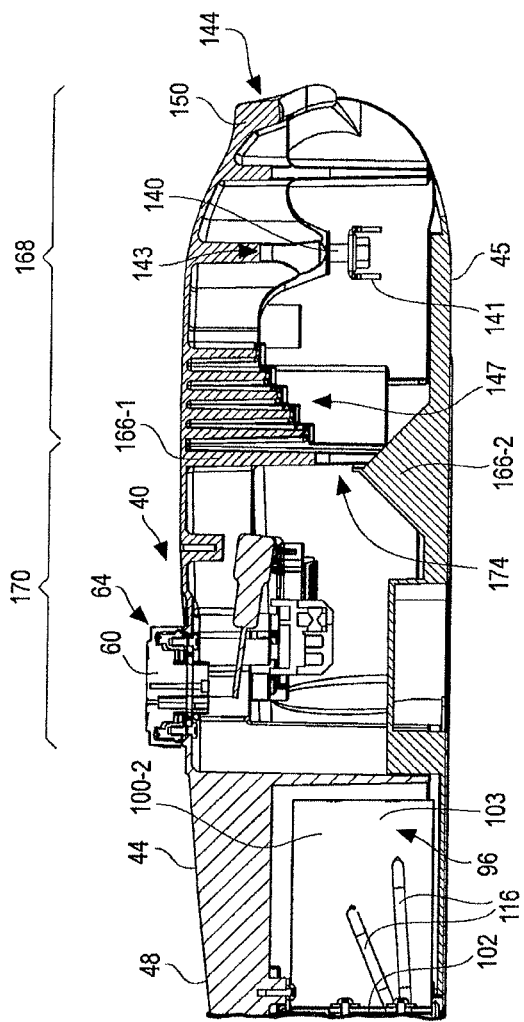
FIGS. 11 and 11A are cross sectional views of the alternative embodiments taken generally along lines 11-11 of FIG. 6 and lines 11A-11A of FIG. 6A, respectively.

As further shown in the large embodiment of FIG. 3, each of the heat exchanger portions 100-1 and 100-2 may further comprise one or more sealed heat pipes 116 that contain a cooling fluid and extend through one or more apertures of at least one and preferably a plurality of fins 103. More specifically, heat pipes 116-1 and 116-2 may be disposed in each heat exchanger portion 100, with a first heat pipe 116-1 being disposed above the second heat pipe 116-2. The heat pipes 116-1 and 116-2 are separate from one another and sealed at both ends thereof, as shown in FIG. 6. The heat pipes 116-1 and 116-2 may extend through apertures located proximal the base plate and further, distal apertures located distal from the base plate 102. As shown in FIG. 11, the first heat pipe 116-1 may extend through distal apertures disposed substantially midway between fin ends proximal the base plate 102 and fin ends distal from the plate 102. In some embodiments, the first heat pipe 116-1 may extend through distal apertures disposed between 30% and 70% of the distance from the base plate 102 to a distal end of the fin 103. Additionally, or alternatively, the second heat pipe 116-2 may extend through distal apertures disposed approximately 70% of the distance from the base plate 102 to the distal end of the fin 103. More specifically, the second heat pipe 116-2 may extend through distal apertures disposed between 50% and 95% of the distance from the base plate 102 to the distal end of the fin 103.

In contrast to the large luminaires 36, the medium-sized luminaire 36a may not include heat pipes 116. Also, the medium sized luminaire 36a may comprise fins 103a of varying length. For example, as shown in FIG. 12A, the fins 103a may comprise three types: one or more long fins 117a disposed substantially in a middle section of a heat exchanger portion 100a, one or more intermediate-length fins 118a disposed farther toward a laterally outermost portion of the heat exchanger portion 100a, and one or more short fins 119a disposed still farther toward the laterally outermost portion of the heat exchanger portion 100a. A short fin 119a associated with the first heat exchanger portion 100-1a may be adjacent to a short fin 119a associated with the second heat exchanger portion 100-2a. In some embodiments, the short fin 119a may have a length between 40% and 80% of the length of the long fin 117a, whereas the intermediate-length fin 118a may have a length between 60% and 90% of the length of the long fin 117a. Moreover, the fins 103a of the luminaire 36a may be thicker than the fins 103 of the luminaire 36, in part to provide increased heat transfer that compensates for the lack of any heat transfer associated with heat pipes.

Figure 4:
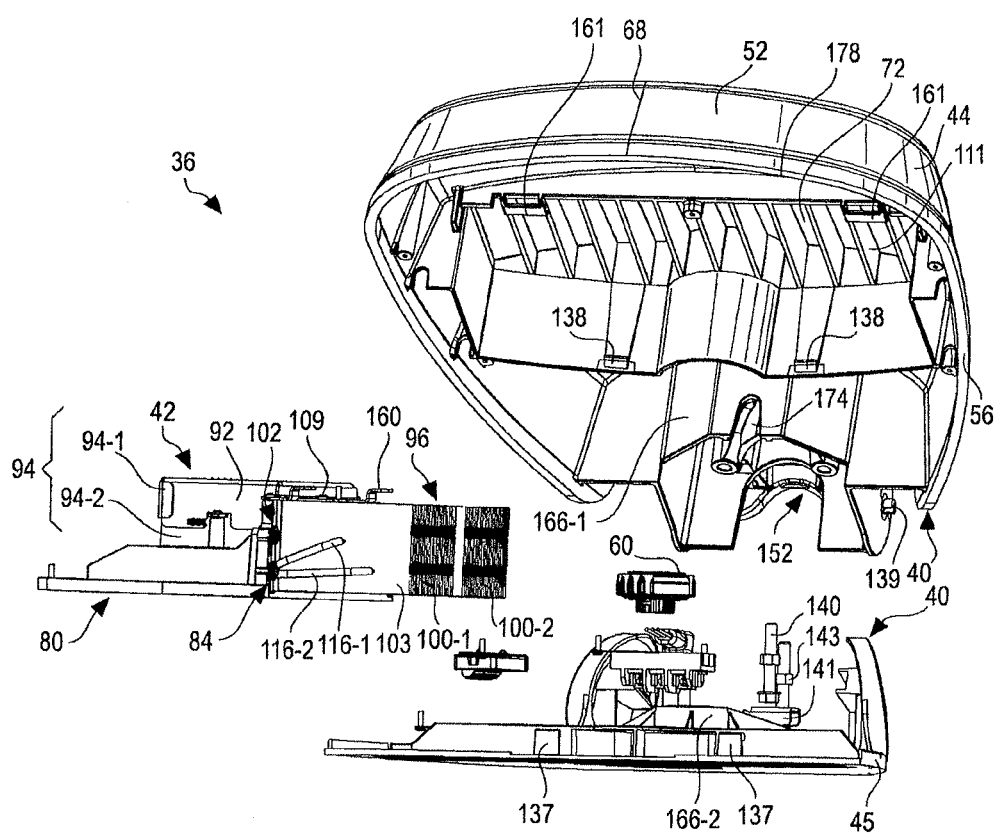
FIGS. 4 and 4A are further exploded views of the alternative embodiments seen in FIGS. 1 and 1A, respectively, with a head assembly and a top housing portion rotated with respect to a bottom housing portion.
Figure 4A:
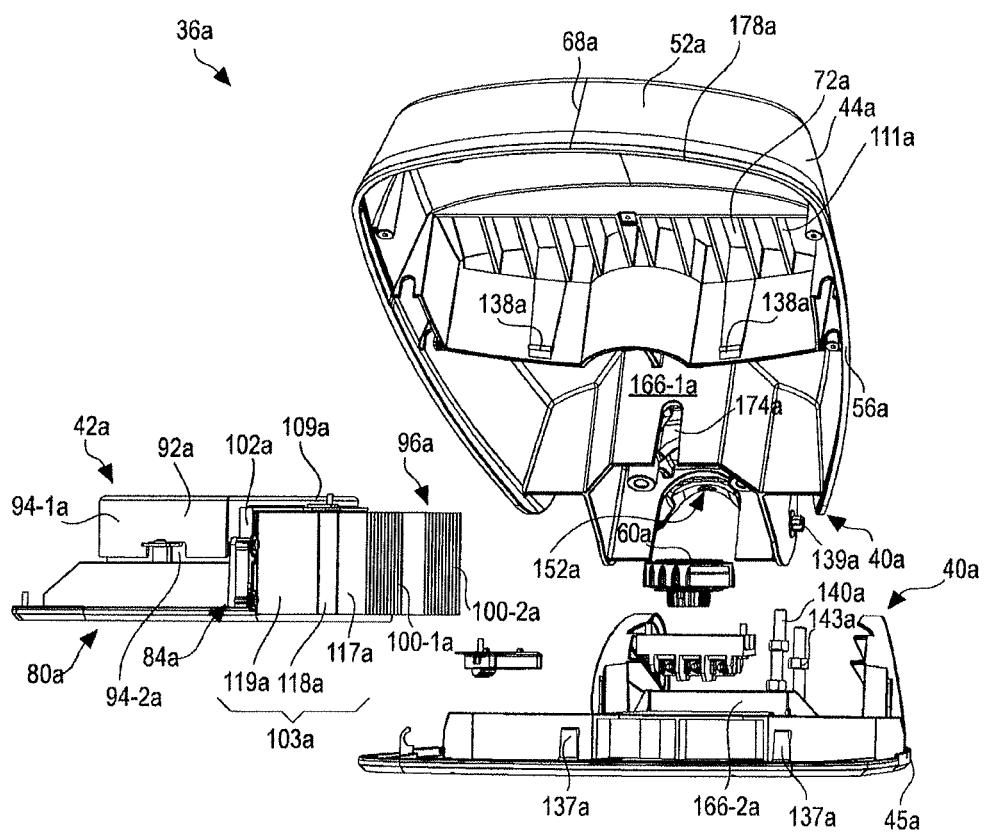

In general, the luminaire 36 may be installed and/or maintained as follows. The customer may receive a luminaire 36 as a complete unit, with the luminaire housing 40 secured to the head assembly 42 and other components of the luminaire 36. The luminaire 36 may be prepared for installation on a stanchion 43 by undertaking the following steps. The bottom housing portion 45 is opened by exerting a downward force on handle 136 shown in FIGS. 2 and 2A. Referring next to FIGS. 4 and 4A, as a result of the downward force, one or more hook portions 137 of the bottom housing portion 45 are uncoupled from one or more retainers 138 of the top housing portion 44. Also as a result of the downward force, the bottom housing portion 45 rotates about pins 139 (that may be integral with top housing portion 44 and which fit inside hollow bosses 139-1 carried by the bottom housing portion 45, as shown in FIG. 13) such that a front portion of the bottom housing portion 45 pivots downward, thus allowing access to secure one or more bolts 140 and one or more brackets 141. The large and medium luminaires 36 and 36a each have four bolts 140 and two brackets 141, whereas the small luminaire 36b has two bolts 140b and one bracket 141b.

Figure 17:
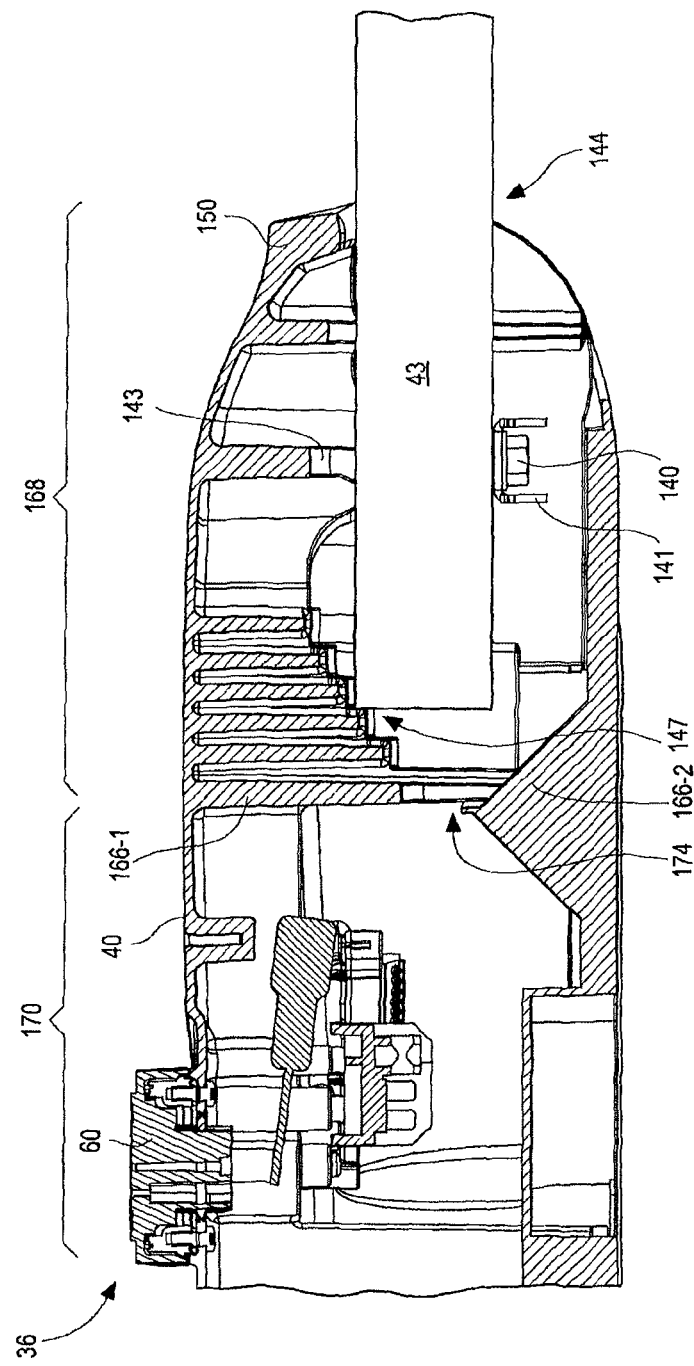
FIGS. 17 and 17A are enlarged cross sectional views taken generally along lines 11-11 of FIG. 6 and lines 11A-11A of FIG. 6A, respectively, of the alternative embodiments with a stanchion disposed in a stepped positioning bracket.
Figure 17A:
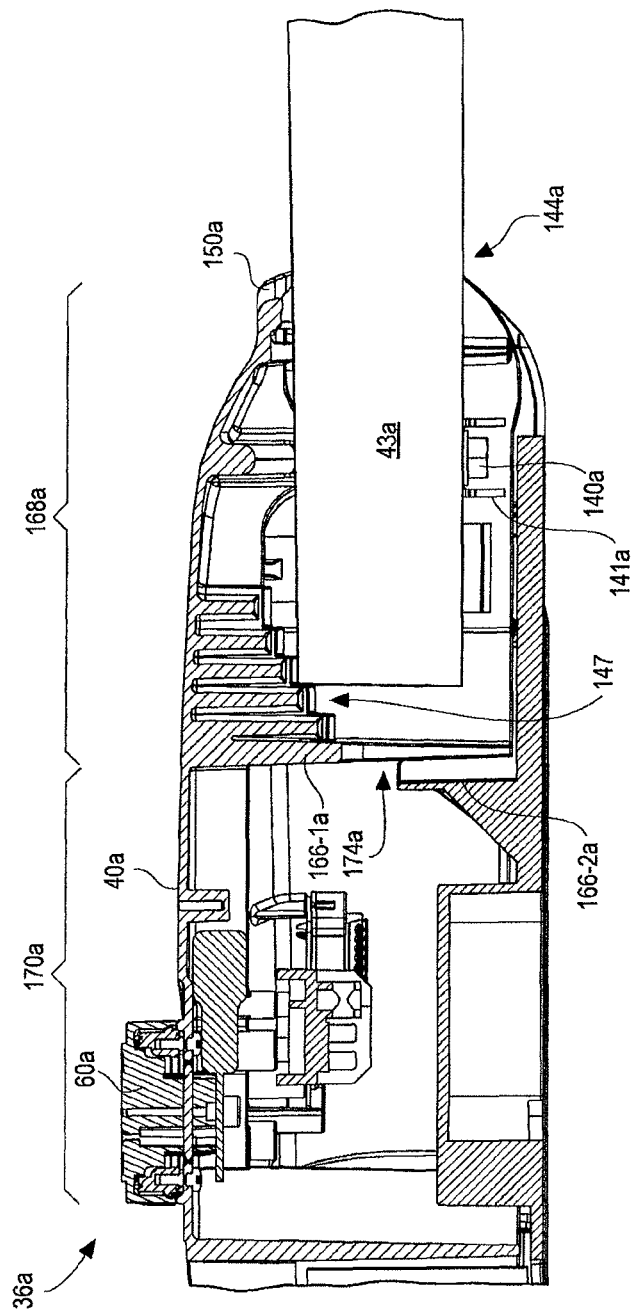

As shown in FIGS. 3 and 3A, the top housing portion 44 comprises at least one, and more preferably, four fastener bores 142. A nut 143 is press-fitted or overmolded in each bore 142. As shown in FIGS. 17 and 17A, the luminaire 36 may be placed onto the stanchion 43 such that an end of the stanchion 43 extends through a mounting aperture 144 and into a space between the mounting brackets 141 and a bottom surface of the top housing portion 44. The end of the stanchion 43 is disposed in a within one of a plurality of angular mounting positions of a stepped positioning bracket 147, as shown in FIGS. 17 and 17A. The positioning bracket 147 allows the luminaire 36 to be mounted at any of a plurality of angular positions on the stanchion 43 and further permits stanchions of different cross sectional sizes to be accommodated. The bolts 140 may thereafter be threaded upwardly into the nuts 143 until the brackets 141 bear against and capture the stanchion 43 against the bottom surface of the top housing portion 44. Electrical connections may then be made in order to electrically connect the LED driver circuit 88 in the driver housing 92.

The bottom housing portion 45 may thereafter be closed by swinging the bottom housing portion 45 upwardly about the pins 139 such that the bottom housing portion 45 pivots until the hook portions 137 snap into engagement with the retainers 138.

Figure 11A:
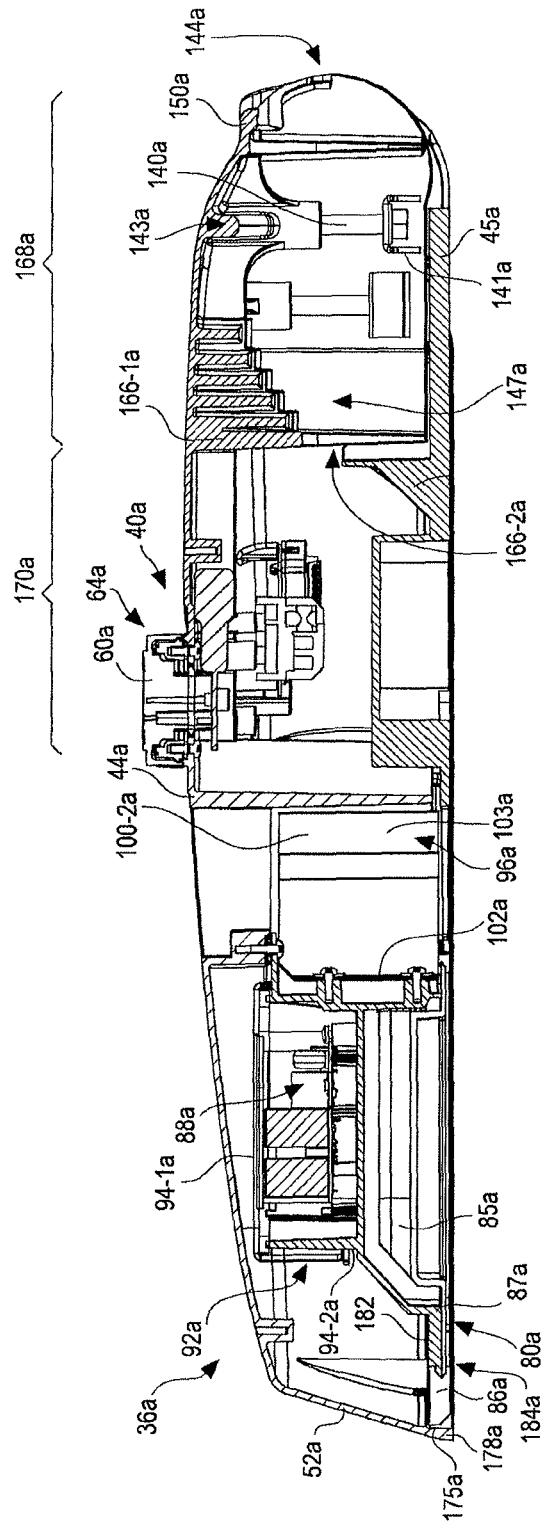

Referring now to FIGS. 11 and 11A, during securement of the bolts 140 in an upward direction, plastic deformation of the brackets 141 may provide flexibility to secure the bolts 140 one or more turns past the recommended or ideal installation torque. For example, the bolts 140 of luminaire 36 may have a recommended installation torque of 150 to 200 inch-pounds. Without the brackets 141, precise installation equipment may be necessary to ensure that the installation torque does not exceed 200 inch-pounds because any applied torque beyond 200 inch-pounds may damage the luminaire housing 40. With the brackets 141, however, one or more of the bolts 140 may be turned one or more additional turns even if one or more of the bolts 140 has already reached 200 inch-pounds because one or more brackets 141 deform in a plastic manner to absorb the torque of the additional turns, and such deformation may prevent the torque from increasing the force on the housing 40 to a significant extent, thus ensuring that the luminaire 36 is not damaged.

Figure 9:
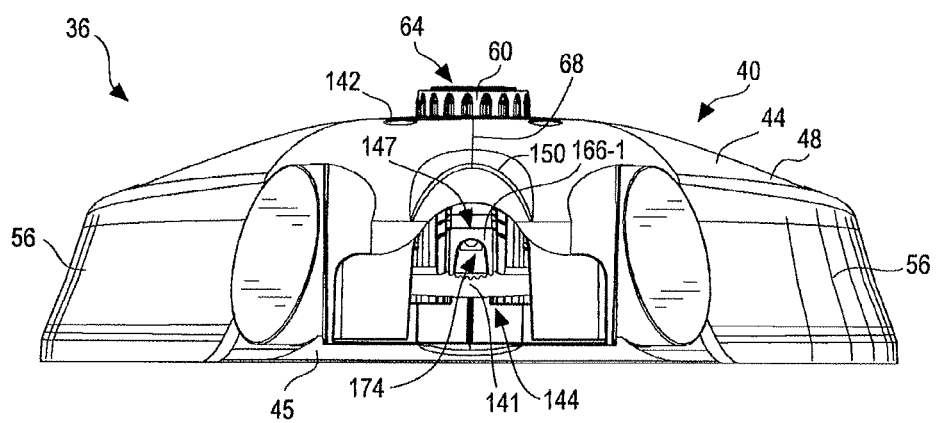
FIGS. 9 and 9A are rear elevational views of the alternative embodiments seen in FIGS. 1 and 1A, respectively.
Figure 9A:
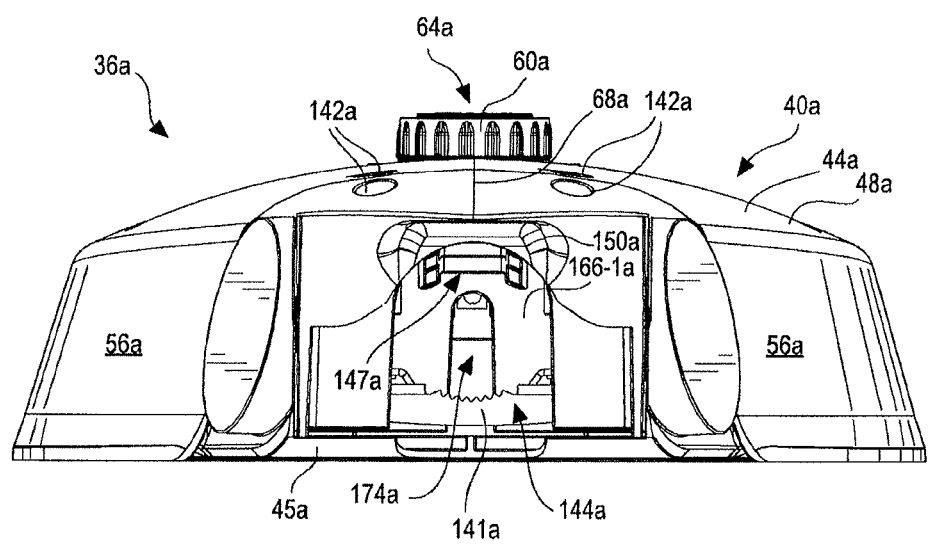

As shown in FIGS. 9, 9A, and 1B, the top housing portion 44 comprises a strengthening member 150 fully or partially surrounding the mounting aperture 144. The strengthening member 150 comprises a section of increased material thickness on the top housing portion 44. The strengthening member 150 provides strength such that the luminaire 36 remains secured to the stanchion 43 without damaging any part of the luminaire 36 (e.g., even in the presence of strong winds, torque imposed during installation, torque imposed during adjustment, or the like).

In contrast to the strengthening member 150 associated with the large luminaire 36 and the strengthening member 150b of the small luminaire 36b, each of which form an arch-like feature with relatively constant curvature, the strengthening member 150a associated with the medium-sized luminaire 36a forms a feature with a relatively flat top and relatively straight sides, as shown in FIG. 9A.

The strengthening members 150, may also provide flexibility during installation and/or adjustment. As the stanchion 43 is secured to the stepped positioning bracket 147 (shown in FIGS. 17 and 17A), the upward force exerted on the bolts 140 causes the top housing portion to exert a downward force on the stanchion 43 proximal the mounting aperture 144. The strengthening member 150 provides additional structural strength to the top housing portion 44, thus allowing the top housing portion 44 to withstand an installation torque that is two times or more than what could otherwise be withstood without the strengthening member 150.

As further shown in FIGS. 12 and 12A, the press-fitted or overmolded nature of the nuts 143 may also provide flexibility during installation and/or adjustment. If a luminaire 36 does not utilize press-fitted nuts 143, the luminaire 36 may instead utilize a thread-forming type of fastener such as thread forming bolts. As an example, thread-forming bolts may need to be mated with the luminaire housing 40 such that half an inch of the bolt is threaded into the luminaire housing 40 for the stanchion 43 to engage the top housing portion 44. Moreover, the thread-forming bolts may need to be threaded an additional one inch to properly secure the stanchion to the luminaire housing 40. As each thread-forming bolt is being inserted into the luminaire housing 40, the required installation torque may increase, as an example, from 300 inch-pounds during the first turn to 700 inch-pounds during the last turn to secure the stanchion 43. This variable and high installation torque may require a high power impact wrench able to exert such torques.

The press-fitted nut(s) 143, on the other hand, may obviate the need for such a high power impact wrench and thus reduce installation and/or maintenance costs. As the bolts 140 are threaded into the press-fitted nuts 143, the required installation torque may be lower and more constant than the installation torque associated with thread-forming bolts. For example, the installation torque may be 100 inch-pounds throughout the vertical movement of the bolts 140 instead of between 300-700 inch pounds.

Referring now to the large embodiment of FIGS. 4 and 5, the plate member 107 further comprises one or more mounting tabs 160 disposed on an upper portion of the heat exchanger 96 (the medium-sized luminaire 36a and the small luminaire 36b may not include mounting tabs). Each of the mounting tabs 160 comprises a vertical portion that connects the mounting tab 160 to the remainder of the plate member 107 and a horizontal portion extending from the vertical portion. The tabs 160 aid in securing the head assembly 42 to the top housing portion 44 by engaging one or more shoulders 161 located at a bottom surface of the top housing portion 44, when the head assembly 42 is assembled to the top housing portion 44.

Figure 13B:
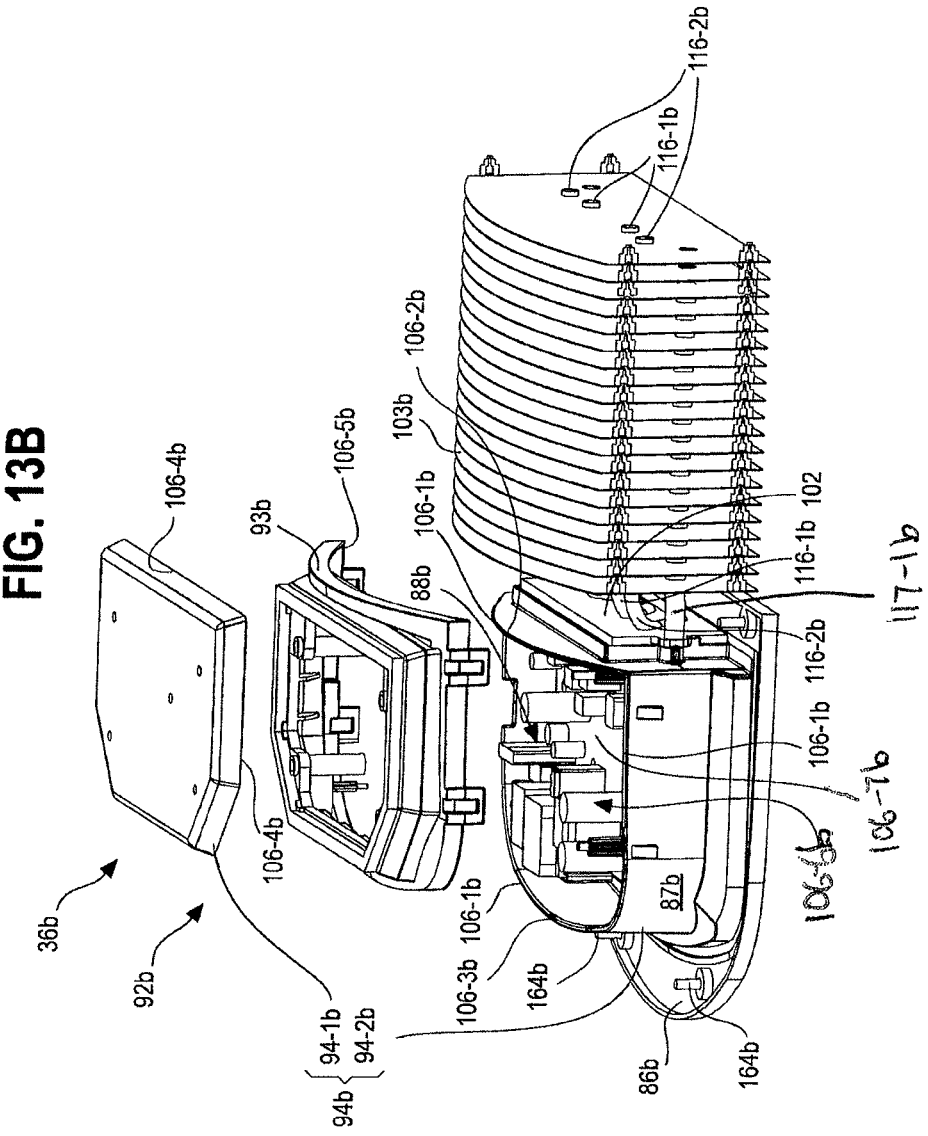

Even after the luminaire 36 has been installed, the head assembly 42 may be removable from the luminaire 36 for maintenance or other purposes. It should be noted that a pair of fasteners or screws 164 extend through apertures in the top housing portion 44 to secure the head assembly 42 to the top housing portion 44, as shown in FIGS. 13, 13A, and 13B. Such a distributed pair of screws 164 imposes less stress on the luminaire housing 40 than if a single central screw 164 were secured proximal the longitudinal center plane 68. Such screws 164 may be removed and the head assembly 42 may then be slightly rotated and moved laterally outwards from the luminaire 36 such that mounting tabs 160 are removed from the shoulders 161. To re-install the head assembly 42, the head assembly 42 may be moved laterally towards the luminaire 36 and pivoted upwardly such that the mounting tabs 160 are again disposed on the shelves 161. The screws 164 may be then be screwed back in to re-install the head assembly 42 once a maintenance session is complete.

As shown in FIGS. 11 and 11A, a splash guard 166 is disposed between a rear portion 168 of the luminaire 36 (i.e., a portion that contains the bolts 140 secured to the stanchion 43) and a mid-portion 170 of the luminaire 36 nearer to the head assembly 42. The splash guard 166 comprises an upper splash guard portion 166-1 integral with the top housing portion 44 and a lower splash guard portion 166-2 integral with the bottom housing portion 45. The splash guard 166 forms a partial barrier between a rear portion 168 and a mid-portion 170 of the luminaire 36, thus protecting electrical and other components in the mid-portion 170 from water or particulate matter that may enter through the mounting aperture 144. The upper splash guard portion 166-1 and the lower splash guard portion 166-2 are disposed such that a splash guard aperture 174 is formed therebetween, as shown in FIGS. 9 and 9A. Wires from the stanchion 43 may extend through the splash guard aperture 174 to reach the mid-portion 170, where the wires may be connected to electrical components therein as described above.

In the illustrated embodiments, the splash guard 166 is integral with the luminaire housing 40. Such an integral splash guard 166 provides support and protection without increasing installation time. Moreover, as should be evident, the splash guard 166 is disposed anterior to the stanchion 43 and the bolts 140. As a result, the stanchion 43 may be secured to any step 154 without necessitating the movement or modification of the splash guard 166. Also, because the splash guard 166 is anterior to the stanchion 43, stanchions 43 of different sizes may be used without necessitating the movement or modification of the splash guard 166, further decreasing installation and/or maintenance costs.

Figure 18:
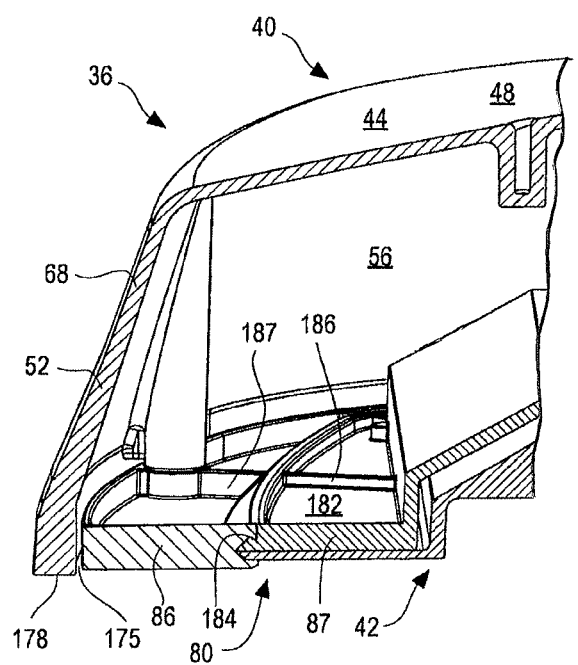
FIGS. 18 and 18A are enlarged cross sectional views taken generally along lines 11-11 of FIG. 6 and lines 11A-11A of FIG. 6A, respectively, of the alternative embodiments, illustrating a lower frame member surrounding an optical waveguide.
Figure 18A:
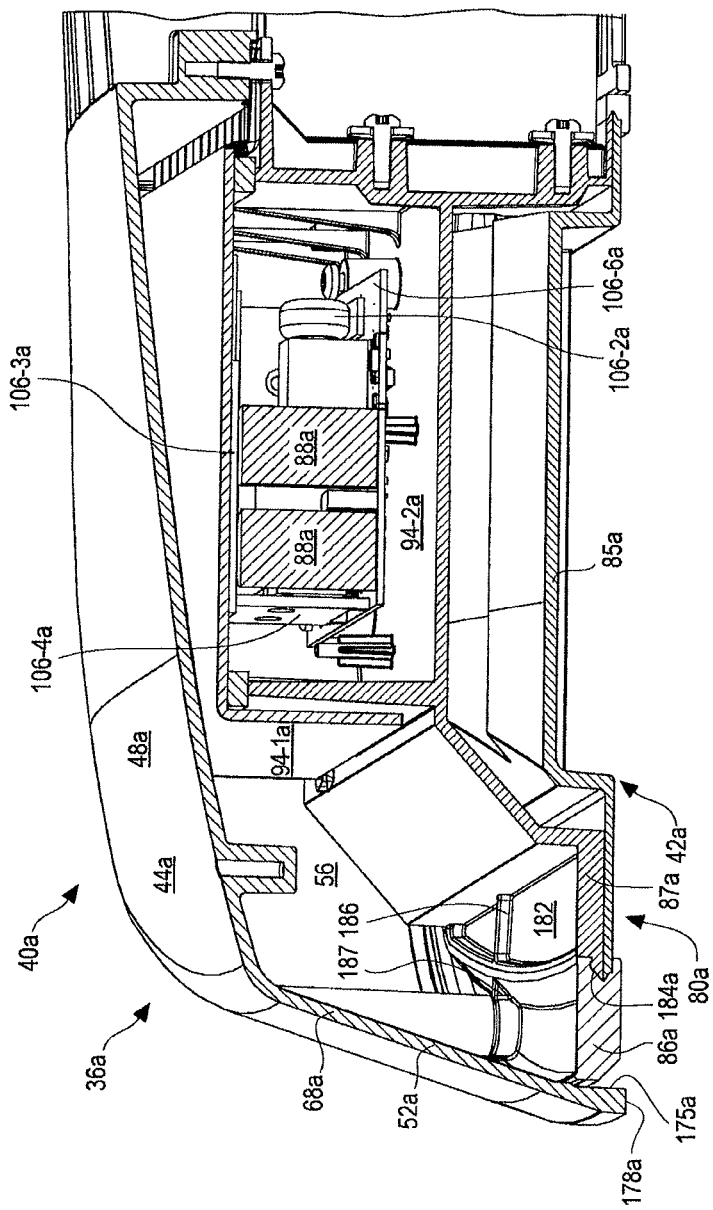
Figure 19:
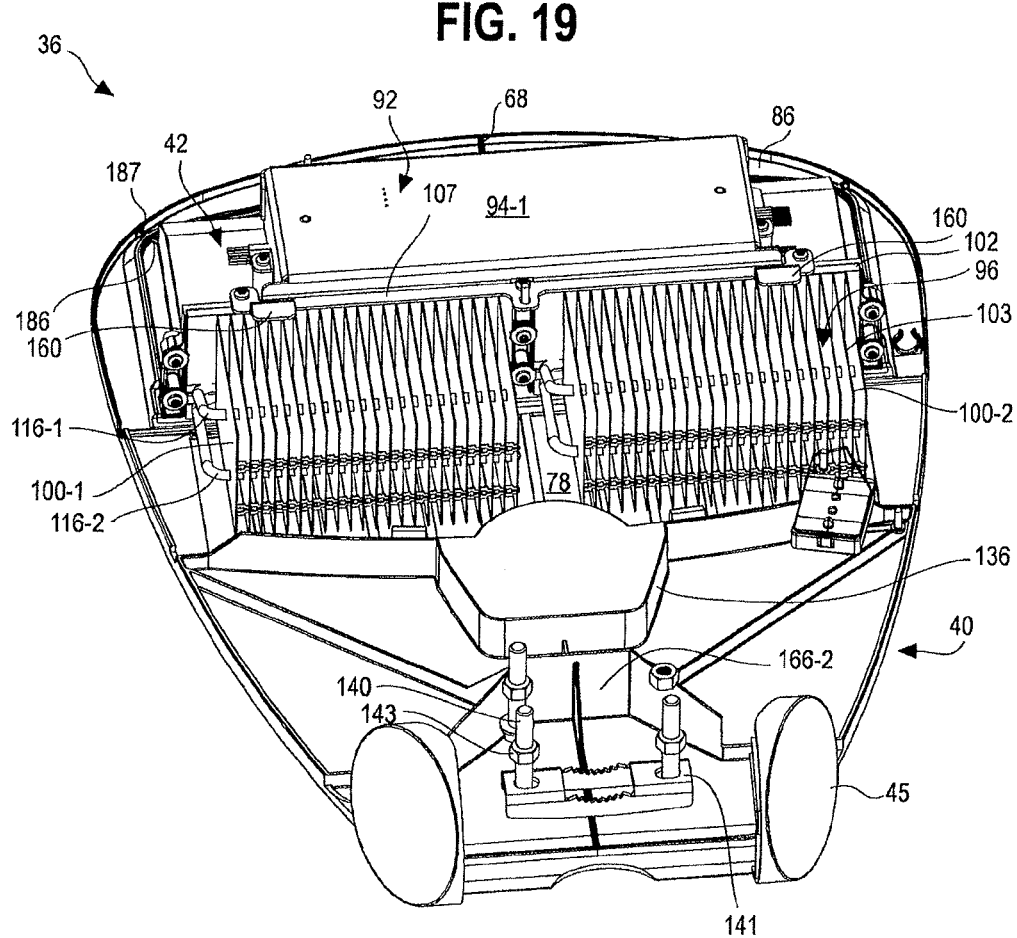
FIGS. 19 and 19A are top isometric views, with the top housing portion and other components removed, of the alternative embodiments seen in FIGS. 1 and 1A, respectively.
Figure 19A:
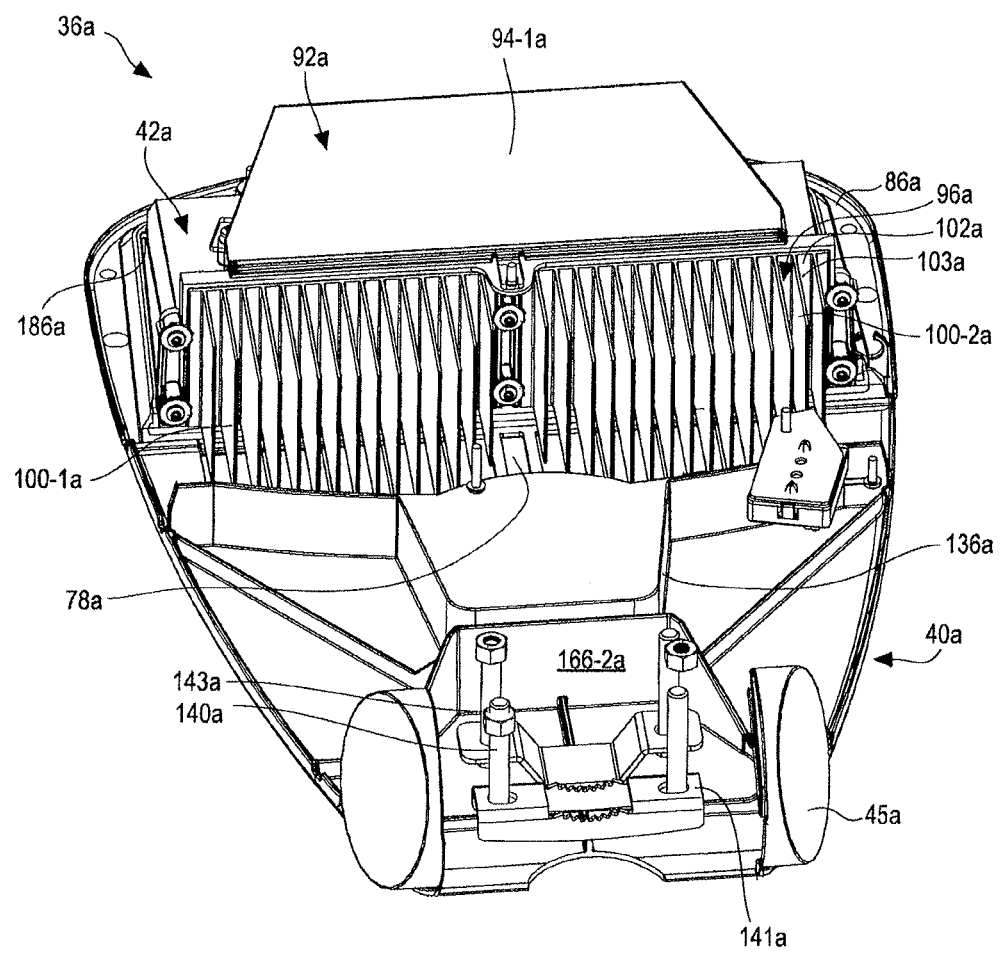

As shown in FIGS. 18 and 18A, a thickness of the front wall 52 of the luminaire housing 40 is greater near a bottom surface of the luminaire 36 than the thickness farther away from the bottom surface. The thickness near the bottom surface of the luminaire 36 may be approximately twice as much as at or proximal the top surface of the luminaire 36. The increased thickness near the bottom surface protects the optical assembly 80 from damage resulting from stresses experienced by the luminaire housing 40. In some embodiments, the thickness near the bottom surface of the luminaire 36 may be between 130% and 270% of the thickness near the top surface of the luminaire 36. In contrast to the front wall 52 of the luminaire 36, the front wall 52a of the luminaire 36a may have a thickness that remains relatively constant for much of the height of the luminaire 36a and then increases somewhat near the bottom surface of the luminaire 36a.

As further shown in FIGS. 18 and 18A, a gap 175 exists between the lower frame member 86 and a bottom lip 178 of the front wall 52. The gap 175 is optionally contiguous around the lower frame member 86, thus isolating the optical assembly 80 from at least some impacts on the luminaire housing 40. In some embodiments, the gap 175 may be between 5% and 90% of the width of the bottom lip 178.

As further shown in FIGS. 18 and 18A, a flange portion 182 of the upper frame member 87 is disposed above a flange portion of the optical waveguide 85. The flange portion 182 and the optical waveguide 85 are sealed together by lower frame member 86 in order to prevent water or particulate matter or other impurities from entering between the optical waveguide 85 and the reflective bottom surface of the upper frame member 87. An interface 184 between the lower frame member 86 and the optical waveguide 85 and the upper frame member 87 is of an arrow-like shape such that the interface 184 has a relatively large surface area. This relatively large surface area increases the strength of the seal provided by the lower frame member 86. As further shown by FIGS. 18 and 18A, the flange portion 182 comprises flange support members 186 that are aligned with lower frame support members 187 in order to transfer stress from the lower frame member 86 directly to the upper frame member 87 while shielding the optical waveguide 85 from experiencing excessive stress.

Figure 12B:
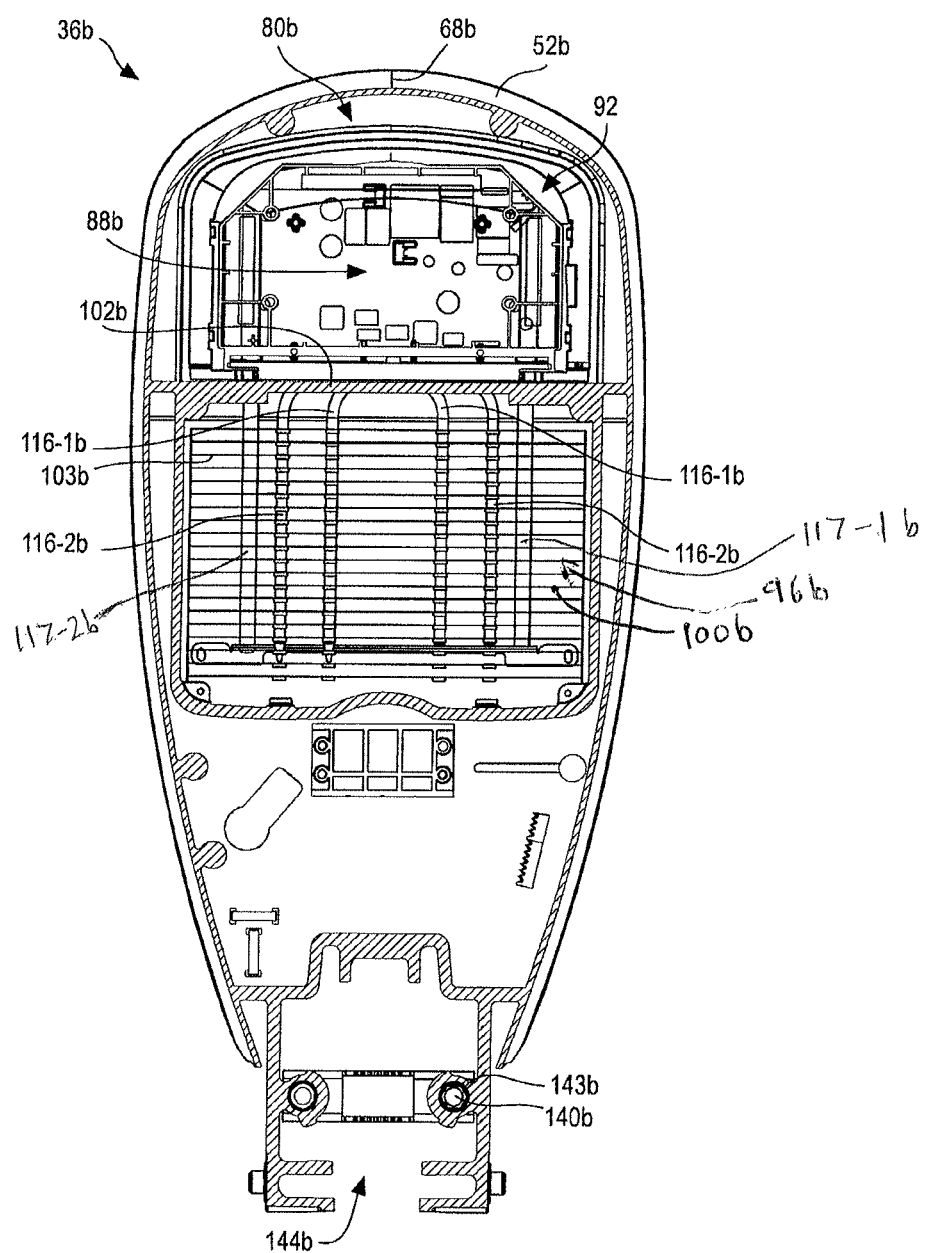

As shown in FIG. 12B, heat exchanger 96b of the small luminaire 36b has a single heat exchanger portion 100b instead of two heat exchanger portions 100. As further shown in FIGS. 12B and 13B, in the small luminaire 36b, the fins 103b are disposed some distance away from the base plate 102b. At least one of the fins 103b defines a plane that is preferably substantially or fully transverse (and more preferably, normal) to the bottom surface of the luminaire 36b and substantially or fully parallel to the base plate 102b. Accordingly, in the small luminaire 36b, the one or more vanes 111b are disposed in an orientation perpendicular to the fins 103b, as best seen in FIG. 1B.

The heat exchanger 96b further comprises a first heat pipe 116-1b and a second heat pipe 116-2b that extend through the fins 103b and are secured to, attached to, or integral with the base plate 102b, as shown in FIG. 13B. The first and second heat pipes 116-1b and 116-2b are roughly U-shaped, with the two ends of each "U" being distal from the base plate 102b and the curved portion of each "U" being secured to, attached to, or integral with the base plate 102b. The two legs of the "U" shape of the second heat pipe 116-2b are disposed farther toward the side walls 56b of the luminaire 36b than the two legs of the "U" shape of the first heat pipe 116-1b, as shown in FIG. 12B. Moreover, lateral rods 117-1b and 117-2b extend through the fins 103b and the base plate 102b and are secured to the driver housing 92b in order to secure the heat exchanger 96b to the head assembly 42b, as shown in FIG. 13B. Such a heat exchanger 96b establishes a path for heat transfer from the base plate 102b to the heat pipes 116b, and then to the fins 103b.

In the small luminaire 36b, as shown in FIG. 13B, the lower portion 94-2b of the outer portion 94b has a curved top edge 106-1b. A rear portion 106-2b of the top edge 106-1b is disposed in a plane substantially parallel to a front surface of the base plate 102b. A front portion 106-3b of the top edge 106-1b is disposed in a plane substantially parallel to a bottom surface of the luminaire 36b. In contrast, the bottom edges 106-4b of the upper portion 94-1b of the outer portion 94b are substantially linear, as best seen in FIG. 13B. It should be noted that the upper portion 94-1b is made of metal and it may be difficult to make a curved metal upper portion 94-1b having curved bottom edges. As further shown, the inner portion 93b comprises curved bottom edges 106-5b that closely fit atop the curved top edge 106-1b. The inner portion 93b further comprises top edges that are substantially linear and receive the substantially linear bottom edges of the upper portion 94-1b. The inner portion 93b may be made of plastic. Using the inner portion 93b as an interstitial layer, as shown in FIG. 16B, allows the curved lower portion 94-2b to be coupled to an easy-to-manufacture, mostly linear-edged, upper portion 94-1b that is made of metal.

In the small luminaire 36b, heat transfer may occur from the LED driver circuit 88b to the upper portion 94-1 at least by convection, and from there to the surrounding environment within the luminaire 36b and outside the luminaire 36b at least by convection. Moreover, as shown in FIG. 16B, LED driver components 106-6b are secured to a circuit board 106-7b. The circuit board 106-7b may be in contact with a lower portion 94-2b that contacts the base plate 102b, thus establishing a path for heat transfer from the LED driver components 106-6b to the circuit board 106-7b at least by conduction, to the lower portion 94-2b at least by conduction, and to the base plate 102b at least by conduction. Other forms of heat transfer may be present as well.

Figure 16B:
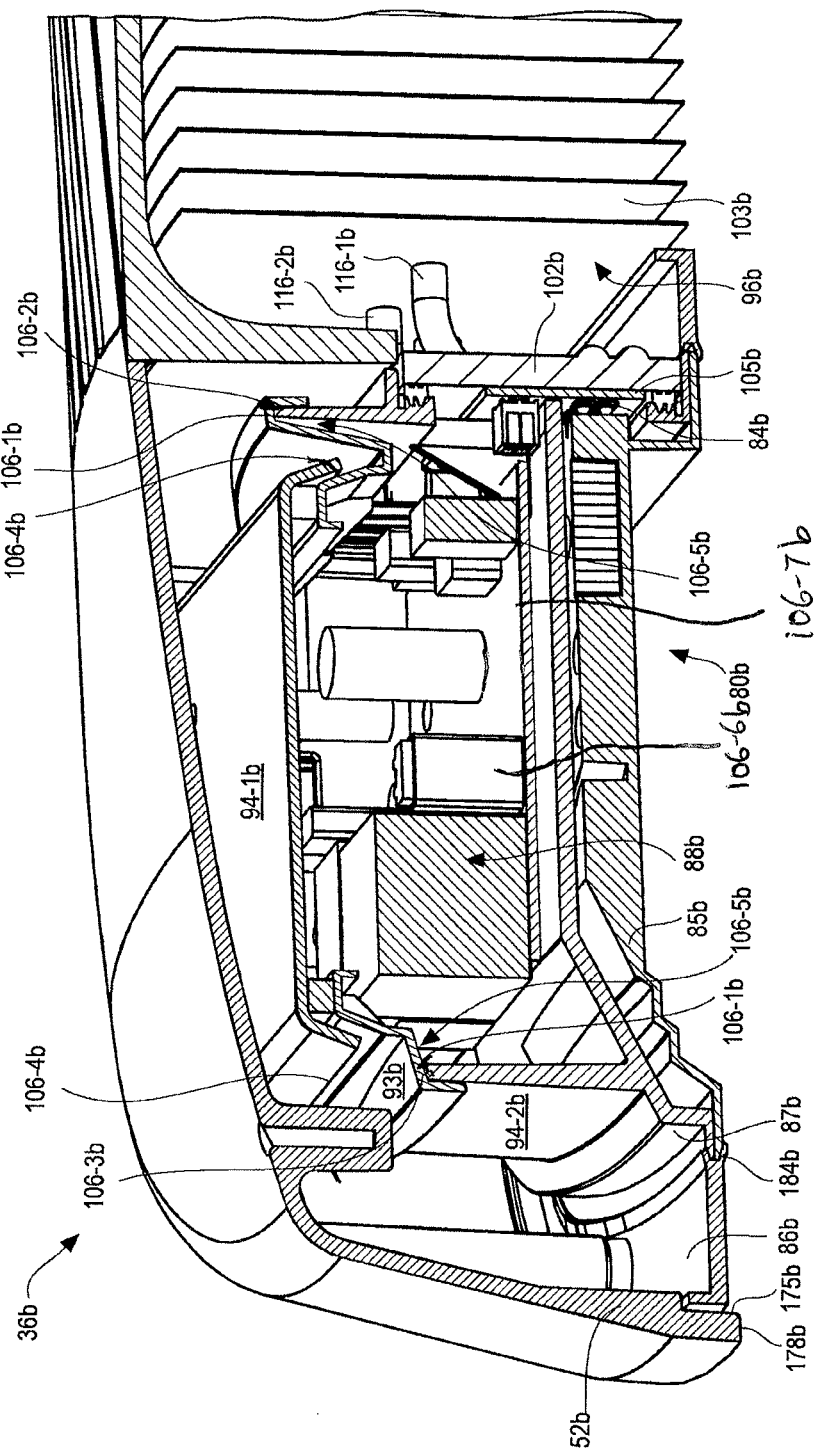

As further shown in FIG. 16B, in contrast to the front walls 52 and 52a, the front wall 52b starts increasing in thickness at approximately one half the height of the front wall 52b and increases to a maximum thickness before reaching the bottom surface of the luminaire 36b. The front wall 52b comprises a recess proximal the bottom surface of the luminaire that allows a vertical part of the lower frame member 86b to be disposed below a part of the front wall 52b.

INDUSTRIAL APPLICABILITY

In summary, a heat exchanger designed and disposed optimally in relation to the LEDs and the LED driver circuit transfers heat efficiently from at least one of the LEDs and, optionally, the LED driver circuit. The luminaire can thus contain a higher capacity LED driver circuit and LEDs that produce a greater luminous flux without causing heat damage to parts of the luminaire. Mechanical aspects of the luminaire provide structural support to withstand stress in a space-saving and cost-saving manner and they also allow for ease of use and maintenance while maintaining durability and a relatively low total weight.

When one uses a relatively small light source which emits into a broad (e.g., Lambertian) angular distribution (common for LED-based light sources), the conservation of etendue, as generally understood in the art, requires an optical system having a large emission area to achieve an asymmetric angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and light distribution. This coupling allows the full range of angular emission from the source, including high-angle light, to be re-directed, resulting in higher optical efficiency in a more compact form factor.

LEDs are disposed within or adjacent the coupling cavities of the waveguide body. Each LED may be a single white or other color LED, or each may comprise multiple LEDs either mounted separately or together on a single substrate or package to form a module including, for example, at least one phosphor-coated or phosphor-converted LED, such as a blue-shifted yellow (BSY) LED, either alone or in combination with at least one color LED, such as a green LED, a yellow LED, a red LED, etc. The LEDs may further include phosphor-converted yellow, red, or green LEDs. One possible combination of LEDs includes at least one blue-shifted-yellow/green LED with at least one blue-shifted-red LED, wherein the LED chip is blue or green and surrounded by phosphor. Any combination of phosphor-converted white LEDs, and/or different color phosphor-converted LEDs, and/or different color LEDs may be used. Alternatively, all the LEDs may be the same. The number and configuration of LEDs may vary depending on the shape(s) of the coupling cavities. Different color temperatures and appearances could be produced using particular LED combinations, as is known in the art. In one embodiment, each light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In some embodiments, each light source comprises any LED such as the LEDs disclosed in U.S. Pat. No. 8,998,444, and/or U.S. Provisional Patent Application No. 62/262,414, filed Dec. 3, 2015, entitled "Solid State Light Fixtures Suitable for High Temperature Operation Having Separate Blue-Shifted-Yellow/Green and Blue-Shifted-Red Emitters" by Bergmann et al., the disclosures of which are hereby incorporated by reference herein. In another embodiment, a plurality of LEDs may include at least two LEDs having different spectral emission characteristics. If desirable, one or more side emitting LEDs disclosed in U.S. Pat. No. 8,541,795, the disclosure of which is incorporated by reference herein, may be utilized inside or at the edge of the waveguide body. In any of the embodiments disclosed herein the LEDs preferably have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source(s).

Further, any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al., the disclosures of which are hereby incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al., the disclosure of which is hereby incorporated by reference herein.

Any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. provisional application No. 61/932,058, filed Jan. 27, 2014, entitled "Enhanced Network Lighting" both owned by the assignee of the present application and the disclosures of which are hereby incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

While specific coupling features and extraction feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, LEDs, redirection features, extraction features, etc. described and/or claimed in U.S. patent application Ser. No. 13/842,521, U.S. patent application Ser. No. 13/839,949, U.S. patent application Ser. No. 13/841,074, filed Mar. 15, 2013, entitled "Optical Waveguide Body", U.S. patent application Ser. No. 13/840,563, U.S. patent application Ser. No. 14/101,086, filed Dec. 9, 2013, entitled "Optical Waveguides and Luminaires Incorporating Same", U.S. patent application Ser. No. 14/101,132, filed Dec. 9, 2013, entitled "Waveguide Bodies Including Redirection Features and Methods of Producing Same,", U.S. patent application Ser. No. 14/101,147, filed Dec. 9, 2013, entitled "Luminaire Using Waveguide Bodies and Optical Elements", U.S. patent application Ser. No. 14/101,129, filed Dec. 9, 2013, entitled "Simplified Low Profile Module with Light Guide for Pendant, Surface Mount, Wall Mount and Stand Alone Luminaires", and U.S. patent application Ser. No. 14/101,051, filed Dec. 9, 2013, entitled "Optical Waveguide and Lamp Including Same", International Application No. PCT/US14/13931, filed Jan. 30, 2014, entitled "Optical Waveguides and Luminaires Incorporating Same", and International Application No. PCT/US14/030017, filed Mar. 15, 2014, entitled "Optical Waveguide Body" are hereby incorporated by reference herein and owned by the assignee of the present application and may be used in a luminaire, either alone or in combination with one or more additional elements, or in varying combination(s) to obtain light mixing and/or a desired light output distribution. Thus, for example, any of the luminaires disclosed herein may include one or more waveguide bodies including coupling features, one or more light redirection features, one or more extraction features or optics, and/or particular waveguide body shapes and/or configurations as disclosed in such applications, as necessary or desirable. Other waveguide body form factors and luminaires incorporating such waveguide bodies are also contemplated.

At least some of the luminaires disclosed herein are particularly adapted for use in installations, such as outdoor products (e.g., streetlights, high-bay lights, canopy lights)

preferably requiring a total luminaire output of at least about 2,000 lumens or greater, and, in some embodiments, a total luminaire output of up to about 10,000 lumens, and, in other embodiments, a total lumen output from about 10,000 lumens to about 23,000 lumens. Further, the luminaires disclosed herein preferably develop a color temperature of between about 2500 degrees Kelvin and about 6200 degrees Kelvin, and more preferably between about 3000 degrees Kelvin and about 6000 degrees Kelvin, and, in some embodiments, between about 3,500 degrees Kelvin and about 4,500 degrees Kelvin. Also, at least some of the luminaires disclosed herein preferably exhibit an efficacy of at least about 90 lumens per watt, and more preferably at least about 100 lumens per watt, and more preferably, at least about 110 lumens per watt, and more preferably, about 115 lumens per watt. Also, at least some of the luminaires disclosed herein exhibit an efficacy of about 115 lumens per watt or greater. Further, at least some of the waveguide bodies used in the luminaires disclosed herein preferably exhibit an overall efficiency (i.e., light extracted out of the waveguide body divided by light injected into the waveguide body) of at least about 90 percent. A color rendition index (CRI) of at least about 80 is preferably attained by at least some of the luminaires disclosed herein, with a CRI of at least about 85 being more preferable. The luminaires disclosed herein produce a scotopic to photopic (S/P) ratio of at least 1.4, preferably at least 2.0. Any desired form factor and particular output light distribution, including up and down light distributions or up only or down only distributions, etc. may be achieved.

Embodiments disclosed herein are capable of complying with improved operational standards as compared to the prior art as follows:

|  | State of the art standards | Improved standards achievable by present embodiments |
| --- | --- | --- |
| Input coupling efficiency (coupling + waveguide body) | 90% | About 95% plus improvements through color mixing, source mixing, and control within the waveguide body |
| Output efficiency (extraction) | 90% | About 95%: improved through extraction efficiency plus controlled distribution of light from the waveguide body |
| Total system | ~80% | About 90%: great control, many choices of output distribution |

In certain embodiments, the waveguide bodies used in the luminaires disclosed herein may generally taper from a central portion to an outside edge thereof so that substantially all light is extracted during a single pass of each light ray from the LED(s) to the outer edge of the waveguide body. This extraction strategy maximizes the incidence of light rays impinging on an outer side of each extraction feature and being reflected out a surface (or surfaces) of the waveguide body in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Still further, the waveguide body is very low profile, leaving more room for heat exchanger structures, driver components, and the like in the luminaire. Also, glare is reduced as compared with other lamps using LED light sources because light is directed outwardly in the waveguide body while being extracted from the waveguide body by the extraction features such that the resulting emitted light is substantially mixed and substantially uniformly distributed throughout the beam angle. The result is a light distribution that is pleasing and particularly useful for general illumination and other purposes using a light source, such as one or more LED.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite. Any of these conditions may be satisfied by the luminaires utilizing waveguide bodies disclosed herein through appropriate modification thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A luminaire, comprising:
    at least one LED that develops light along a substantially horizontal light axis and disposed on a substantially vertical heat conductive member;
    an optical waveguide that redirects the light developed by the LED into a light path substantially transverse to the light axis;
    an LED driver circuit for supplying electric power to the LED; and
    a heat exchanger comprising:
        a thermally conductive base plate comprising a lower portion disposed in heat transfer relationship with the LED and an upper portion proximate the lower portion and disposed in heat transfer relationship with the driver circuit, wherein the LED and the driver circuit are disposed to a first side of the base plate, and
        a plurality of substantially vertical heat transfer fins disposed on a second side of the base plate opposite the first side.

2. The luminaire of claim 1, wherein the LED driver circuit is disposed within a driver housing, the driver housing comprising an inner portion and an outer portion, and wherein the LED driver circuit transfers heat by conduction to the inner portion.

3. The luminaire of claim 2, wherein the inner portion contacts the outer portion.

4. The luminaire of claim 3, wherein the outer portion contacts the heat exchanger.

5. The luminaire of claim 3, wherein an upper portion of the outer portion of the driver housing is disposed above substantially the lateral dimensions of the LED driver circuit.

6. The luminaire of claim 3, wherein the outer portion comprises an upper portion and a lower portion, wherein the upper portion contacts the heat exchanger.

7. The luminaire of claim 1, further comprising:
the heat exchanger comprising first and second heat exchanger portions disposed horizontally apart;
the at least one LED being included in a first set of LEDs;
the first set of LEDs being disposed horizontally apart from a second set of LEDs;
the first heat exchanger portion being in thermal communication with the first set of LEDs; and
the second heat exchanger portion being in thermal communication with the second set of LEDs.

8. The luminaire of claim 1, further comprising the heat exchanger comprising a plurality of fins in thermal communication with the base plate, the heat exchanger further comprising one or more heat pipes extending through one or more apertures of at least one fin of the plurality of fins.

9. The luminaire of claim 1, further comprising the heat exchanger comprising a plurality of fins in thermal communication with the base plate, wherein the plurality of fins extends from the base plate and comprises a first fin and a second fin, the first fin extending a first distance from the base plate and the second fin extending a second distance from the base plate, the first distance being larger than the second distance.

10. A luminaire, comprising:
a luminaire housing;
at least one LED disposed within the luminaire housing;
an LED driver circuit disposed within a driver housing that comprises an inner portion and an outer portion, at least a part of the inner portion being disposed between the LED driver circuit and the outer portion, wherein the LED driver circuit is in thermal communication with the outer portion; and
a heat exchanger comprising a base plate having a lower portion and an upper portion, wherein the lower portion is in thermal communication with the at least one LED, wherein the upper portion is in thermal communication with the LED driver housing, wherein the LED and the driver housing are disposed on a first side of the base plate.

11. The luminaire of claim 10, wherein the inner portion of the driver housing contacts the outer portion and the LED driver circuit transfers heat to the inner portion by conduction.

12. The luminaire of claim 10, wherein the luminaire housing comprises a strengthening member proximal a mounting aperture, the strengthening member comprising a section of increased thickness.

13. The luminaire of claim 10, wherein a surface of the luminaire housing comprises a bore, the luminaire further comprising a fastener that is associated with the bore and secures the luminaire to a stanchion.

14. The luminaire of claim 13, wherein the fastener is associated with a nut that is at least one of press-fitted and overmolded.

15. The luminaire of claim 13, wherein the fastener extends through an aperture of a mounting bracket, the mounting bracket being capable of plastic deformation.

16. A luminaire, comprising:
a luminaire housing that comprises a top housing portion and a bottom housing portion; and
a head assembly coupled to the top housing portion, at least partially enclosed by the luminaire housing, and having a bottom surface adjacent to the bottom housing portion, the head assembly comprising an optical assembly comprising an optical waveguide, the head assembly further comprising at least one LED adjacent the optical waveguide, an LED driver circuit disposed within a driver housing, and a heat exchanger comprising a base plate with upper and lower portions wherein the lower portion is in thermal communication with the at least one LED, wherein the driver housing comprises an inner portion in thermal communication with the LED driver circuit and an outer portion in thermal communication with the inner portion of the housing and the upper portion of the base plate, and wherein the head assembly further comprises one or more mounting tabs each comprising a horizontal surface configured to rest on a shoulder of the top housing portion.

17. The luminaire of claim 16, wherein a thickness of a front wall of the luminaire housing is greater near a bottom surface of the luminaire than the thickness farther away from the bottom surface of the luminaire.

18. The luminaire of claim 16, wherein the optical assembly further comprises a lower frame member laterally surrounding the optical waveguide and sealing an upper surface of the optical waveguide.

19. The luminaire of claim 18, wherein the lower frame member transfers stress to an upper frame member via support members of the lower frame member that are aligned with support members of the upper frame member.

* * * * *